US012483839B2

(12) United States Patent
Tong et al.

(10) Patent No.: US 12,483,839 B2
(45) **Date of Patent: *Nov. 25, 2025**

(54) SPEAKER DEVICE

(71) Applicant: ShenZhen Luxshare Acoustics Technology Ltd., Shenzhen (CN)

(72) Inventors: ZhiHua Tong, Shenzhen (CN); ZhiHe Zeng, Shenzhen (CN)

(73) Assignee: SHENZHEN LUXSHARE ACOUSTICS TECHNOLOGY LTD., Shenzhen (CN)

( * ) Notice: Subject to any disclaimer, the term of this patent is extended or adjusted under 35 U.S.C. 154(b) by 189 days.

This patent is subject to a terminal disclaimer.

(21) Appl. No.: 18/221,328

(22) Filed: Jul. 12, 2023

(65) Prior Publication Data

US 2024/0022861 A1 Jan. 18, 2024

(30) Foreign Application Priority Data

Jul. 13, 2022 (CN) ......................... 202210820494.2
Nov. 25, 2022 (CN) ......................... 202211491253.4

(51) Int. Cl.
*H04R 9/06* (2006.01)
*H04R 1/28* (2006.01)
(Continued)

(52) U.S. Cl.
CPC ............. *H04R 9/06* (2013.01); *H04R 1/2896* (2013.01); *H04R 7/18* (2013.01); *H04R 7/20* (2013.01);
(Continued)

(58) Field of Classification Search
CPC .......... H04R 9/06; H04R 1/2896; H04R 7/18; H04R 7/20; H04R 9/025; H04R 9/043;
(Continued)

(56) References Cited

U.S. PATENT DOCUMENTS

D881,160 S 4/2020 Huang
11,985,460 B1 5/2024 Lu
(Continued)

FOREIGN PATENT DOCUMENTS

CN 201967122 U 9/2011
CN 103297904 B 9/2015
(Continued)

*Primary Examiner* — Angelica M McKinney
(74) *Attorney, Agent, or Firm* — Birch, Stewart, Kolasch & Birch, LLP

(57) ABSTRACT

The present invention discloses a speaker device, which comprises: a magnetic element, which has a magnetic carrier and a magnetic circuit module, the magnetic carrier has two lateral walls and one bottom plate, the two lateral walls are disposed at two sides of the bottom plate, the magnetic circuit module is disposed on the bottom plate; an outer frame, which is disposed at a peripheral side of the magnetic element; two elastic members, each is connected with the magnetic carrier and the outer frame, and the elastic member is respectively disposed at two sides of the magnetic carrier; a vibration member, which is disposed on the outer frame and at the magnetic element and the two elastic members; and a voice coil, which is disposed underneath the vibration member and located among the magnetic circuit module and the two lateral walls of the magnetic carrier.

34 Claims, 16 Drawing Sheets

(51) Int. Cl.

| | |
|---|---|
| ***H04R 7/04*** | (2006.01) |
| ***H04R 7/18*** | (2006.01) |
| ***H04R 7/20*** | (2006.01) |
| ***H04R 9/02*** | (2006.01) |
| ***H04R 9/04*** | (2006.01) |

(52) U.S. Cl.

CPC ............. *H04R 9/025* (2013.01); *H04R 9/043* (2013.01); *H04R 9/045* (2013.01); *H04R 9/046* (2013.01); *H04R 9/063* (2013.01); *H04R 7/045* (2013.01); *H04R 2400/11* (2013.01); *H04R 2499/11* (2013.01)

(58) Field of Classification Search

CPC ........ H04R 9/045; H04R 9/046; H04R 9/063; H04R 7/045; H04R 2400/11; H04R 2499/11; H04R 9/02; H04R 7/04; H04R 1/023; H04R 1/2826

See application file for complete search history.

(56) References Cited

U.S. PATENT DOCUMENTS

| | | | | |
|---|---|---|---|---|
| 12,143,796 | B2 * | 11/2024 | Tong | H04R 9/045 |
| 2020/0045440 | A1 * | 2/2020 | Zhou | H04R 1/023 |
| 2022/0174411 | A1 * | 6/2022 | Song | H04R 7/04 |
| 2022/0322013 | A1 * | 10/2022 | Lv | H04R 9/046 |
| 2022/0394388 | A1 * | 12/2022 | Chang | H04R 9/02 |
| 2023/0217181 | A1 | 7/2023 | Yang et al. | |
| 2023/0224641 | A1 | 7/2023 | Tong et al. | |
| 2023/0232156 | A1 | 7/2023 | Tong et al. | |
| 2024/0022863 | A1 | 1/2024 | Tong et al. | |
| 2024/0179460 | A1 | 5/2024 | Tong et al. | |
| 2025/0030985 | A1 * | 1/2025 | Tong | H04R 7/20 |
| 2025/0030986 | A1 * | 1/2025 | Tong | H04R 9/025 |

FOREIGN PATENT DOCUMENTS

| | | | | |
|---|---|---|---|---|
| CN | 107517430 A | | 12/2017 | |
| CN | 109951773 A | | 6/2019 | |
| CN | 111405438 A | | 7/2020 | |
| CN | 211959552 U | | 11/2020 | |
| CN | 113453128 A | | 9/2021 | |
| CN | 114143675 A | * | 3/2022 | H04R 1/2826 |
| CN | 114745643 A | | 7/2022 | |
| CN | 115103275 A | | 9/2022 | |
| EM | 009061658-0001 | | 1/2022 | |
| JP | D1515243 S | | 1/2015 | |
| KR | 30-0461796 S | | 9/2007 | |
| KR | 30-1001549 S | | 4/2019 | |
| TW | D157384 S | | 11/2013 | |
| TW | M615661 U | | 8/2021 | |
| TW | I751069 B | | 12/2021 | |
| TW | M620751 U | | 12/2021 | |
| TW | I763515 B | | 5/2022 | |
| TW | M641589 U | | 5/2023 | |
| TW | M642069 U | | 6/2023 | |

* cited by examiner

SPEAKER DEVICE

CROSS REFERENCE TO RELATED APPLICATION

This application claims the priority benefits of Chinese Patent Application Serial Number 202210820494.2, filed on Jul. 13, 2022, and another Chinese Patent Application Serial Number 202211491253.4, filed on Nov. 25, 2022, the full disclosure of which is incorporated herein by reference.

BACKGROUND

Technical Field

The present invention is in related to the technical field of a speaker device, more particularly to a speaker device with elastic members to reduce the impact of vibrations.

Related Art

In the prior art, with the improvement of the quality of life and the popularization of smart mobile devices, people are constantly pursuing the sound quality of the playback sound quality of the speakers that can be carried around. Present speakers are mainly composed of magnets, coils and diaphragms and convert the vibrations of the current frequencies into sounds. Regarding how to further improve the performance of the speaker for playing music, one of the difficult problems to be solved is the problem of resonance and heat dissipation.

SUMMARY

The present invention discloses a speaker device, which objective is to solve the problem that of the poor effect of playing music since the resonance of the present speaker device affects the vibration of the whole case of the speaker device, and another problem, that is, the temperature of the speaker device to rise caused by resonance is lead to the malfunction speaker device.

One of the embodiments of the present invention discloses a speaker device, which comprises a magnetic element, an outer frame, two elastic members, a vibration member, and a voice coil; the magnetic element has a magnetic carrier and a magnetic circuit module; the magnetic carrier has two lateral walls and one bottom plate; the two lateral walls are disposed at two sides of the bottom plate; the magnetic circuit module is disposed on the bottom plate; the outer frame is disposed at a peripheral side of the magnetic element; each of two elastic members is connected with the magnetic carrier and the outer frame, and the elastic member is respectively disposed at two sides of the magnetic carrier; the vibration member is disposed on the outer frame and located at the magnetic element and the two elastic members; and the voice coil is disposed underneath the vibration member and located among the magnetic circuit module and the two lateral walls of the magnetic carrier; wherein a first interval is defined as a distance between the outer frame and each of the two lateral walls, and the magnetic element is disposed in the outer frame in a suspended connection through the two elastic members.

One of the embodiments is disclosed, that is, one of the two elastic members has two first flexible members, and the two first flexible members are connected with two ends of the magnetic carrier without the two lateral walls and the outer frame.

One of the embodiments is disclosed, that is, each of the two first flexible members has a fixing bracket, a connecting arm and a connecting bracket, the fixing bracket is connected with the outer frame, one end of the connecting arm is connected with the fixing bracket, another end of the connecting arm is connected with the connecting bracket, and the connecting bracket is connected with the magnetic carrier.

One of the embodiments is disclosed, that is, the connecting arm is a curved structure, and a side, adjacent to the connecting arm, of the connecting bracket has an avoidance gap.

One of the embodiments is disclosed, that is, the bottom plate of the magnetic carrier has an avoidance portion, which corresponds to the avoidance gap of the connecting bracket, the avoidance gap is connected with the avoidance portion.

One of the embodiments is disclosed, that is, the connecting bracket is bent toward the fixing bracket, two ends of the connecting bracket are connected with and fixed to the bottom plate.

One of the embodiments is disclosed, that is, an edge, corresponding to the connecting bracket, of the bottom plate is elongated and protruded, and the edge of the bottom plate is mated and connected with the connecting bracket.

One of the embodiments is disclosed, that is, one end of the bottom plate corresponding to the connection bracket has a notch, and the connection bracket is correspondingly assembled in the notch.

One of the embodiments is disclosed, that is, one side of the connecting bracket corresponding to the notch is elongated and protruded at least one supporting convex portion, the notch corresponding to the support convex portion is a connecting concave portion, which is engaged with the support convex portion.

One of the embodiments is disclosed, that is, the speaker device further comprises a damper, which is disposed at the fixing bracket of the first flexible member, the fixing bracket is fixed and connected with the outer frame via the damper.

One of the embodiments is disclosed, that is, the damper further comprises a body portion and a fixing convex portion, the fixing convex portion is disposed at one side of the body portion, the fixing bracket is wrapped around by the body portion, the outer frame has a fixing groove and a fixing notch, the fixing groove is communicated with the fixing notch, the body portion is embedded into the fixing groove, and the fixing convex portion is embedded into the fixing notch.

One of the embodiments is disclosed, that is, each of the two elastic member has two second flexible members, the two second flexible members are connected with the two lateral walls of the magnetic carrier and the outer frame.

One of the embodiments is disclosed, that is, each of the two second flexible members has a first connecting side, a second connecting side and a bending portion, the bending portion are bent and connected with the first connecting side and the second connecting side, one of two internal sides of the outer frame has one connecting groove respectively, the first connecting side is fixed on a top edge of the lateral wall of the magnetic carrier, the second connecting side is fixed in the connecting groove.

One of the embodiments is disclosed, that is, the bending portion is plural, a spacing hole is between the pair of two adjacent bending portions.

One of the embodiments is disclosed, that is, the first connecting side wraps around the top edge of the lateral wall of the magnetic carrier.

One of the embodiments is disclosed, that is, one side, corresponding to the connecting groove, of the second connecting side has a protrusion, the second connecting side is embedded in the connecting groove, the protrusion is fastened above a side wall of the connecting groove.

One of the embodiments is disclosed, that is, the elastic member further has two third flexible members, which are connected with the two lateral walls of the magnetic carrier and the outer frame.

One of the embodiments is disclosed, that is, the third flexible member has a first metal side, a second metal side, and a metal bracket, two ends of the metal bracket are connected with the first metal side and the second metal side, the first metal side is fixed at a top edge of the lateral wall of the magnetic carrier, the second metal side is fixed at the outer frame.

One of the embodiments is disclosed, that is, the metal bracket is parallel to the first metal side and the second metal side, one end of the metal bracket is laterally elongated to connected with the first metal side, another end of the metal bracket is laterally elongated to connected with the second metal side.

One of the embodiments is disclosed, that is, the elastic member further has two fourth flexible members, which are disposed at the third flexible members, each of the two fourth flexible members is disposed between the lateral wall of the magnetic carrier and the outer frame.

One of the embodiments is disclosed, that is, the fourth flexible member has a first connecting side, a second connecting side and a bending portion, the bending portion is bent and connected with the first connecting side and the second connecting side, the first connecting side is fixed at the first metal side of the metal bracket, the second connecting side is fixed at the second metal side of the metal bracket.

One of the embodiments is disclosed, that is, the bending portion is plural, a air hole between the pair of two adjacent bending portions.

One of the embodiments is disclosed, that is, the air hole corresponds to the metal bracket.

One of the embodiments is disclosed, that is, a height of the lateral wall is equal to a height of the magnetic circuit module.

One of the embodiments is disclosed, that is, the speaker device further comprises a bottom case, which is beneath the outer frame, a second interval is defined as a distance between the bottom plate of the magnetic carrier of the magnetic element and the bottom case.

One of the embodiments is disclosed, that is, the speaker device further comprises a bottom case, which is beneath the outer frame, a position, corresponding to the damper, of the bottom case, is an urging portion, in order to urge the damper.

One of the embodiments is disclosed, that is, the magnetic circuit module further comprises a magnetic body and a magnetic plate, the magnetic body is disposed on the bottom plate, the magnetic plate is disposed on the magnetic body.

One of the embodiments is disclosed, that is, the outer frame further comprises a first frame and a second frame, two external sides of the elastic member are fixed at the first frame and the second frame.

One of the embodiments is disclosed, that is, the first frame has a first frame portion and two first fixing portions, the two first fixing portions are at two ends of the first frame portion, the second frame has a second frame portion and two second fixing portions, the second frame portion is combined on the first frame portion, two outer sides of the elastic member are fixed at the first frame portion and the second frame portion, the two second fixing portions are combined on the two first fixing portions.

One of the embodiments is disclosed, that is, the first frame portion is protruded out between the two first fixing portions, the second frame portion is recessed between the two second fixing portions, the first frame portion is embedded in the second frame portion, the two second fixing portions are combined on the two first fixing portions.

One of the embodiments is disclosed, that is, two heights of the two first fixing portions are the same as two heights of the two second fixing portions.

One of the embodiments is disclosed, that is, the two first fixing portions have two fixing holes, the two second fixing portions have two columns, the two columns of the two second fixing portions are embedded in the two fixing holes of the two first fixing portions.

One of the embodiments is disclosed, that is, the outer frame further has a plurality of first air holes and second air holes the first air holes are disposed on a side surface of the first frame portion of the first frame, the second air holes are disposed between the two first fixing portions of the first frame and the two second fixing portions of the second frame.

One of the embodiments is disclosed, that is, the first frame portion is recessed in the two second fixing portions, a height of the second frame is the same as two heights of the two second fixing portions, the second frame portion is disposed on the first frame portion, the second frame portion covers a recess structure of the first frame portion.

One of the embodiments is disclosed, that is, the two first fixing portions have side columns at corners thereof, and the two second fixing portions have side grooves, the side columns of the two first fixing portions are embedded in the side grooves of the two second fixing portions.

One of the embodiments is disclosed, that is, the outer frame further has a plurality of first air holes and second air holes, the first air holes are disposed on a side surface of the first frame portion of the first frame, the second air holes are disposed on an end surface of the first fixing portion of the first frame.

The present invention provides a speaker device, the elastic members of which are connected with the magnetic element and the outer frame. When the magnetic element performs electromagnetic induction to make the voice coil and the vibration member vibrate and produce sound, the magnetic element will vibrate under the same reaction force. At this time, the vibration force of the magnetic element is transmitted to the outer frame through the elastic members, and the vibration force has been absorbed by the elastic members to greatly reduce the impact on the outer frame, thereby reducing the impact of the vibration of the outer frame on the vibration member.

The accompanying drawings are incorporated in and constitute a part of this application and, together with the description, serve to explain the principles of the invention in general terms. Like numerals refer to like parts throughout the disclosure.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
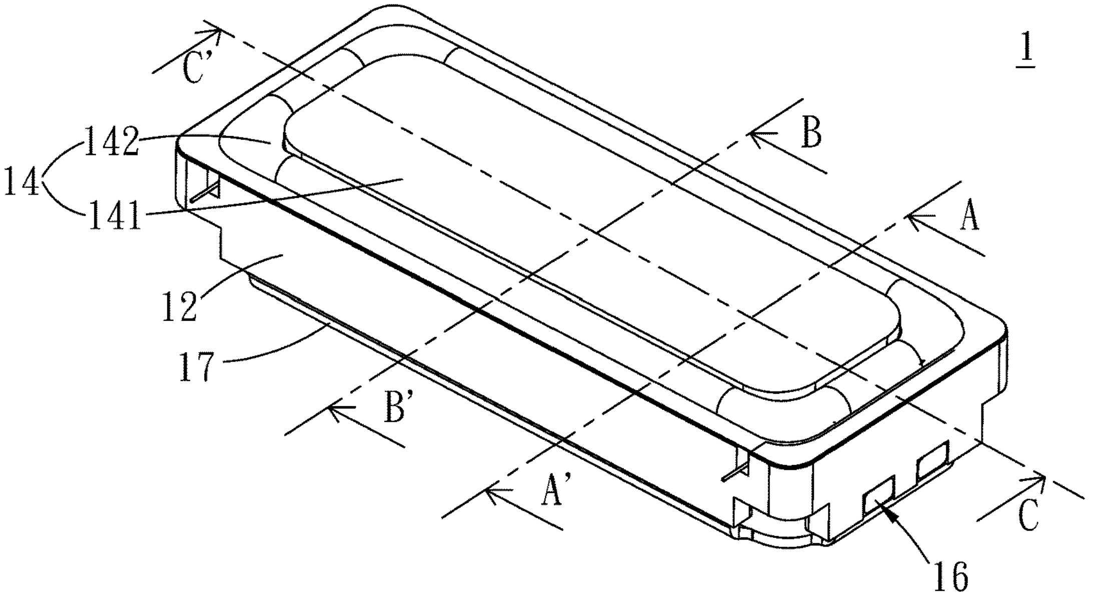
FIG. 1 illustrates a schematic 3-D view of the speaker device of the present invention.
Figure 2:
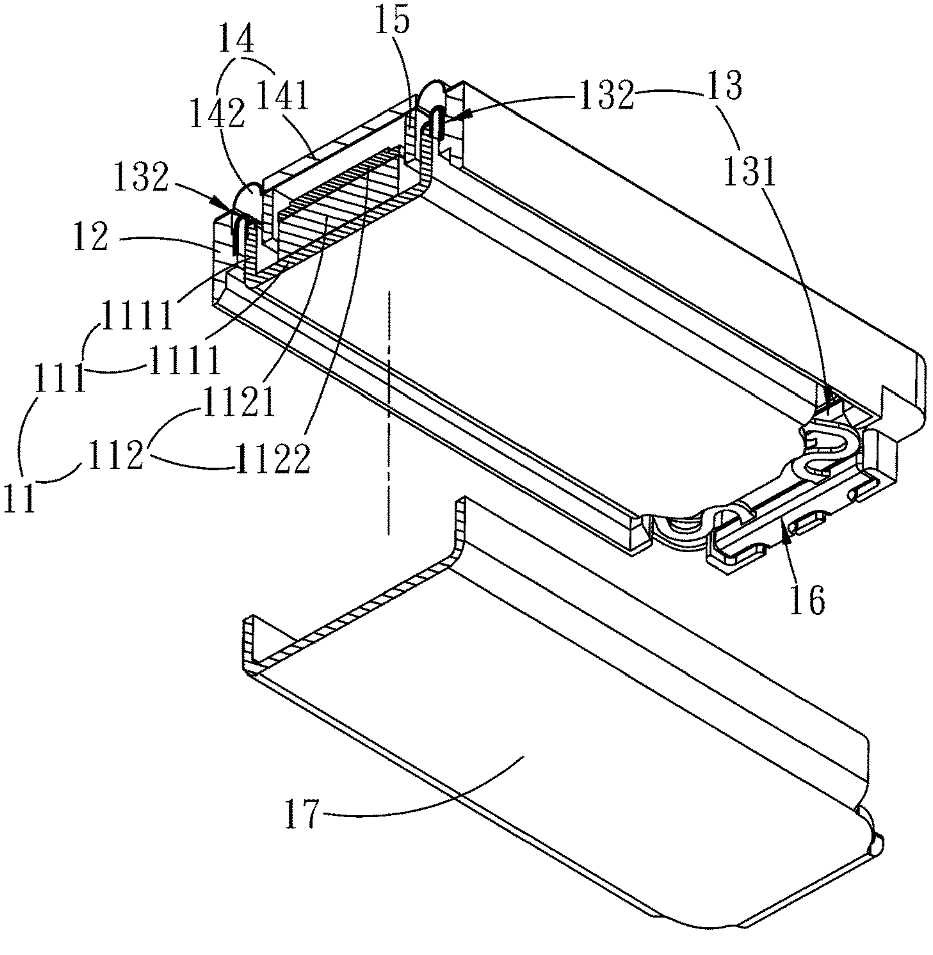
FIG. 2 illustrates an exploded perspective 3-D view of a cross section taken along line A-A' of FIG. 1.
Figure 3:
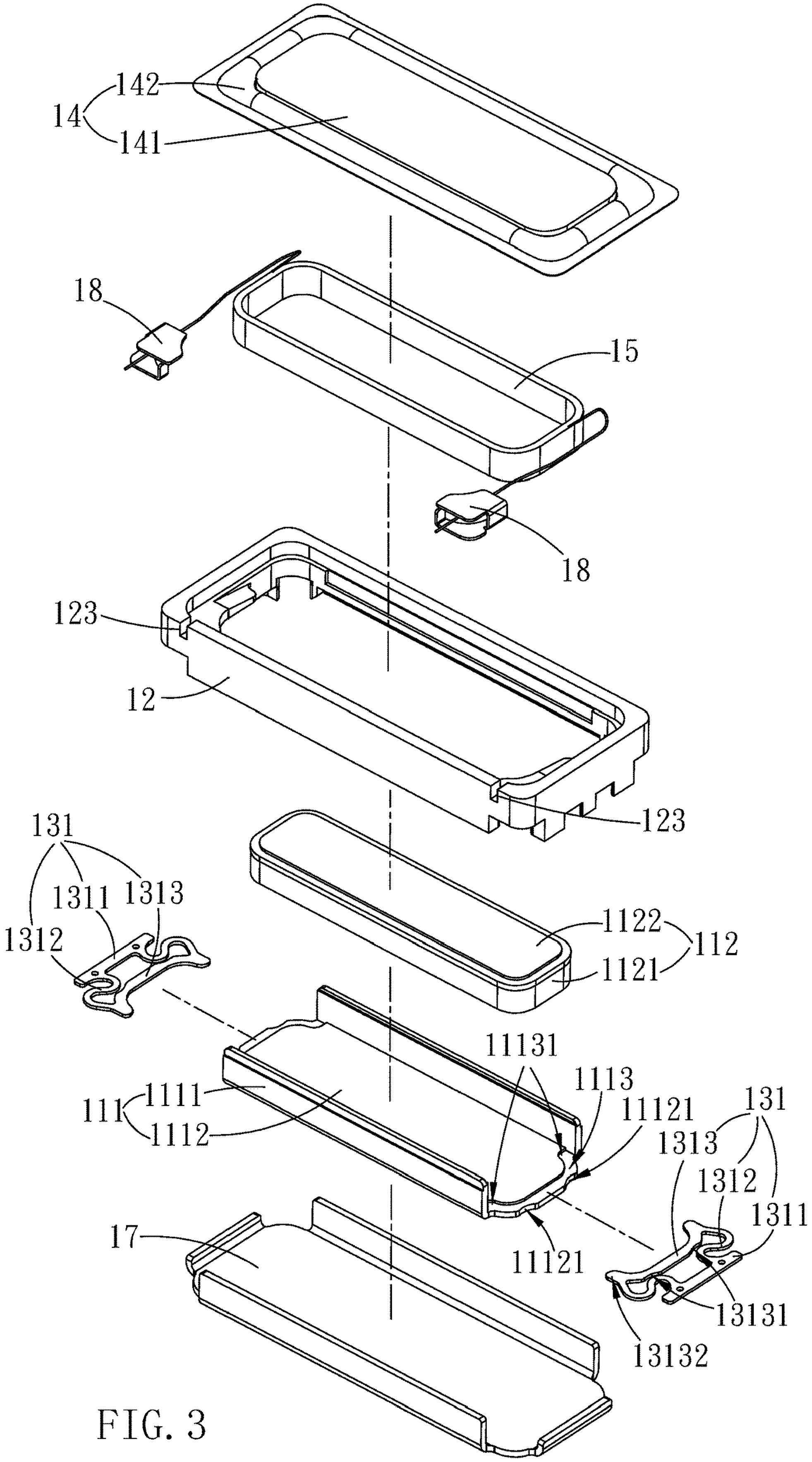
FIG. 3 illustrates a schematic exploded view of the speaker device of the present invention.

Please refer to FIG. 1 to FIG. 3, FIG. 1 illustrates a schematic 3-D view of the speaker device of the present invention, FIG. 2 illustrates an exploded perspective 3-D view of a cross section taken along line A-A' of FIG. 1, and FIG. 3 illustrates a schematic exploded view of the speaker device of the present invention. The present invention provides a speaker device 1, which includes a magnetic element 11, an outer frame 12, two elastic members 13, a vibration member 14, and a voice coil 15. The magnetic element 11 includes a magnetic carrier 111 and a magnetic circuit module 112, wherein the magnetic carrier 111 has two lateral walls 1111 and one bottom plate 1112, the two lateral walls 1111 are disposed at two sides of the bottom plate 1112, the magnetic circuit module 112 is disposed on the bottom plate 1112. The outer frame 12 is disposed at a peripheral side of the magnetic element 11. Each of the two elastic members 13 is connected with the magnetic carrier 111 and the outer frame 12, and the elastic member 13 is respectively disposed at two sides of the magnetic carrier 111. The vibration member 14 is disposed on the outer frame 12 and located at the magnetic element 11 and the two elastic members 13. Further, the vibration member 14 has a vibration film 141 and a bent ring 142, wherein the bent ring 142 surrounds a peripheral of the vibration film 141, and a peripheral of the bent ring 142 is connected with a peripheral of the outer frame 12. The voice coil 15 is disposed underneath the vibration member 14 and located among the magnetic circuit module 112 and the two lateral walls 1111 of the magnetic carrier 111, wherein a first interval D1 (referring to FIG. 12 and FIG. 13) is defined as a distance between the outer frame 12 and each of the two lateral walls 1111, and the magnetic element 11 is disposed in the outer frame 12 in a suspended connection through the two elastic members 13.

The speaker device 1 further has two electrical fixing members 18. The outer frame 12 further has two electrical openings 123. The electrical fixing member 18 is fixed on the outer frame 12 and corresponds to the electrical opening 123. Two ends of the voice coil 15 are fixed by the two electrical fixing members 18, and the two ends of the voice coil 15 penetrate through the two electrical openings 123 to connect with an external power.

During the power-on operation of the speaker device 1 of the present invention, the audio current passes through the voice coil 15 to let the voice coil 15 be affected by the magnetic field force of the magnetic element 11, so that the voice coil 15 drives the vibrating member 14 to vibrate for producing sound. Simultaneously, the magnetic element 11 may also be subjected to the reaction force of the voice coil 15. The force received by the magnetic element 11 is equal to the voice coil's 15, but the direction of the force is opposite, so that the direction of the magnetic element 11 is opposite to the voice coil's 15 in vibration. Through the elastic member 13 connecting with the outer frame 12, the vibration force from the magnetic element 11 is transmitted to the outer frame 12 via the elastic member 13. Most of the vibration force is absorbed by the elastic member 13 in order to decrease the affection to the outer frame 12. Continuously, the affection from the vibration of the outer frame 12 to the vibration member 14 is reduced.

Since the magnetic element 11 is disposed in the outer frame 12 in a suspended connection through the two elastic members 13, the two elastic members 13 play the role of dampers as well, in order to balance the movement or vibration of the magnetic element 11 in the speaker device 1. The influence or interference of other external forces in the environment can also be reduced by the elastic element 13.

Figure 4:
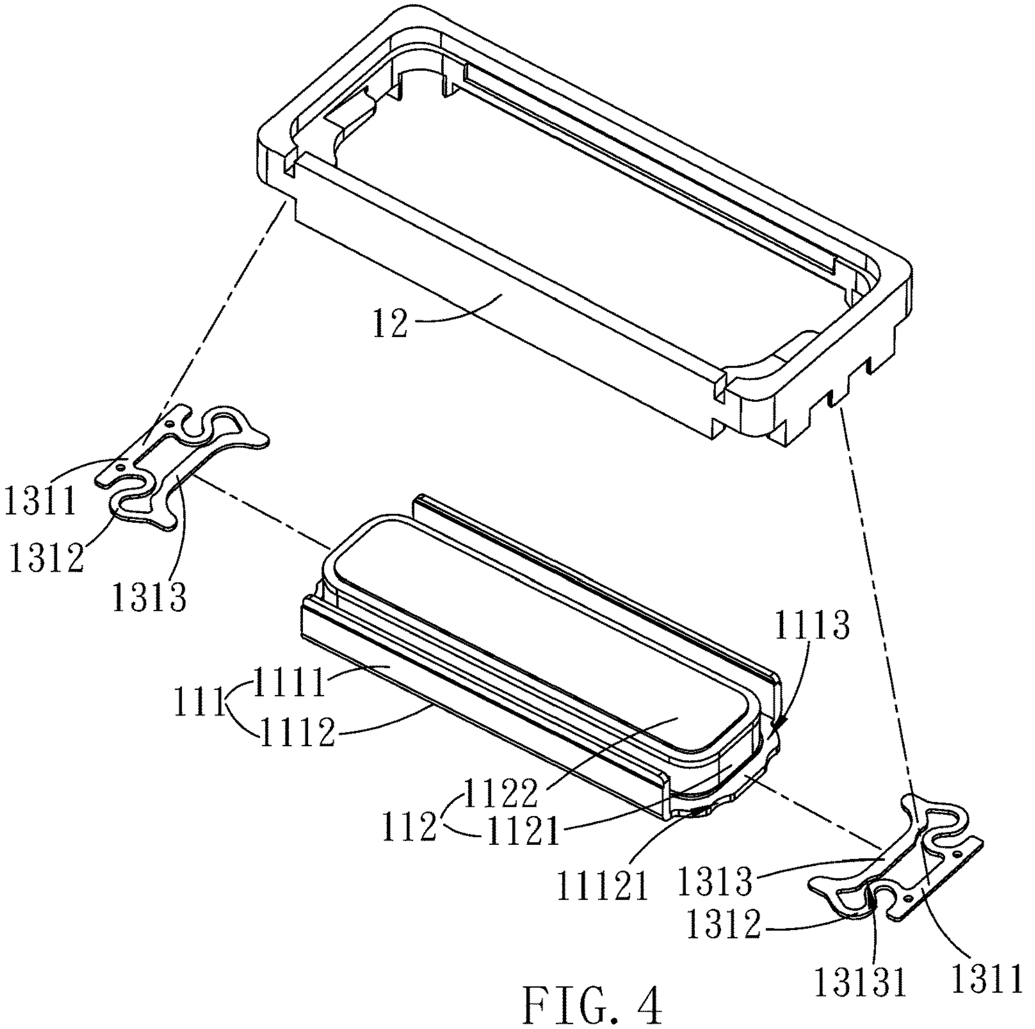
FIG. 4 illustrates a schematic partial exploded view of a first embodiment of the speaker device of the present invention.
Figure 5:
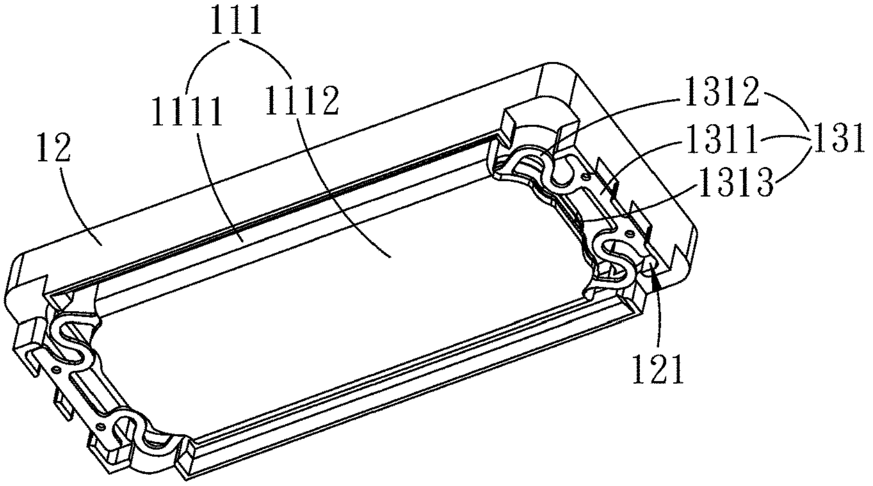
FIG. 5 illustrates a s a schematic partial view of the first embodiment of the speaker device of the present invention.

Please refer to FIG. 4 and FIG. 5 at the same time. FIG. 4 and FIG. 5 illustrate a schematic partial exploded view of a first embodiment of the speaker device of the present invention and a schematic partial view of the first embodiment of the speaker device of the present invention. As to the embodiment, the elastic member 13 has two first flexible members 131, the two first flexible members 131 are connected with two ends of the magnetic carrier 111 without the two lateral walls 1111 and the outer frame 12. Therefore, the first interval D1, defined as the distance between the outer frame 12 and each of the two lateral walls 1111 of the magnetic carrier 111 of the magnetic element 11, is an internal room for the magnetic element 11 being disposed in a suspended connection.

As mentioned above, each of the two first flexible members 131 has a fixing bracket 1311, a connecting arm 1312 and a connecting bracket 1313. The fixing bracket 1311 is connected with the outer frame 12. One end of the connecting arm 1312 is connected with the fixing bracket 1311, and another end of the connecting arm 1312 is connected with the connecting bracket 1313. The connecting bracket 1313 is connected with the magnetic carrier 111. The connecting bracket 1313 is bent toward the fixing bracket 1311, and two ends of the connecting bracket 1313 are elongated into the bottom plate 1112 of the magnetic carrier 111 and connected with the two ends of the connecting bracket 1313 for being connected with and fixed to the bottom plate 1112. Since the two ends of the connecting bracket 1313 are internally elongated and fixed in the bottom plate 1112 of the magnetic carrier 111, the positions to fix for the connecting bracket 1313 are able to maintain the balance of the magnetic element 11, in order to avoid a problem of large left and right swings while the magnetic element 11 vibrates up and down.

The connecting arm 1312 is a curved structure as an S-type, and it is demanded by needs. The figure of the connecting arm 1312 is assured to be that the vibration frequency of the magnetic element 11 is similar to the vibration frequency of the voice coil 15 driving the vibration member 14, in order to form mutual cancellation, and avoid that of the vibration of the magnetic element 11 affecting the vibration and sound of the vibration component 14. A side, adjacent to the connecting arm 1312, of the connecting bracket 1313 has an avoidance gap 13131. In this way, when the first flexible member 131 is absorbing the vibration of the magnetic element 11, the up and down vibration or left and right shaking of the connecting arm 1312 of the first flexible member 131 will not be affected by the interference of the connecting bracket 1313 of the first flexible member 131. The bottom plate 1112 of the magnetic carrier 111 has an avoidance portion 11121, which corresponds to the avoidance gap 13131 of the connecting bracket 1313, and the avoidance gap 13131 is connected with the avoidance portion 11121. The function of avoidance portion 11121 is the same as that of the avoidance gap 13131, so it is not described any further hereinafter. More, the first flexible member 131 is made of stainless steel or other flexible materials.

An edge, corresponding to a bending angle of the connecting bracket 1313, of the bottom plate 1112 of the magnetic carrier 111 is elongated and protruded out. The edge of the bottom plate 1112 of the magnetic carrier 111 is mated and connected with a side of the whole connecting bracket 1313. One end of the bottom plate 1112 of the magnetic carrier 111 corresponding to the connection bracket 1313 has a notch 1113, which is a relative installing element and corresponds to the connection bracket 1313. Therefore, the connection bracket 1313 is correspondingly assembled in the notch 1113, in order to let the first flexible member 131 be firmly installed at the bottom plate 1112 of the magnetic carrier 111. One side of the connecting bracket 1313 corresponding to the notch 1113 is elongated and protruded at least one supporting convex portion 13132, and the notch 1113 corresponding to the support convex portion 13132 is a connecting concave portion 11131, which is engaged with the support convex portion 13132, in order to enhance the strength of the first flexible member 131 being firmly installed at the bottom plate 1112 of the magnetic carrier 111.

Figure 6:
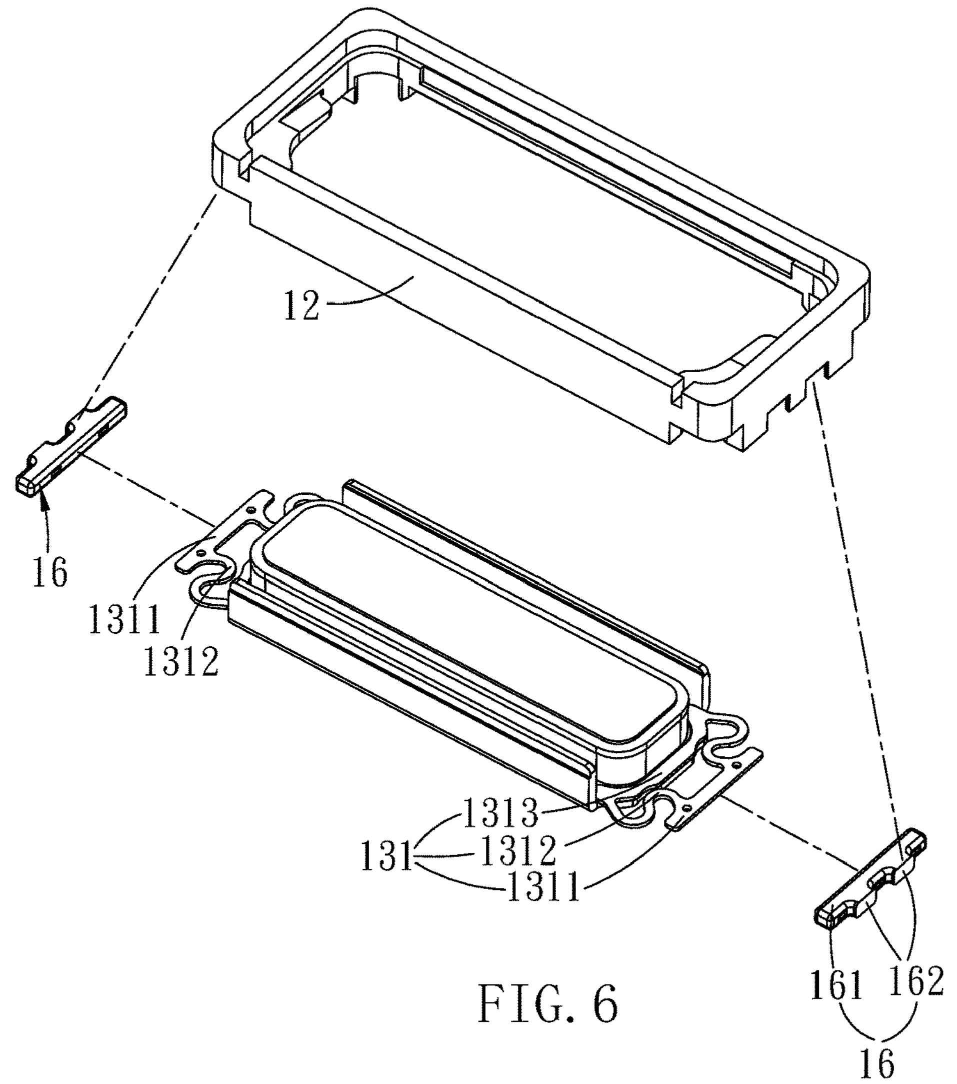
FIG. 6 illustrates a schematic partial exploded view of a second embodiment of the speaker device of the present invention.
Figure 7:
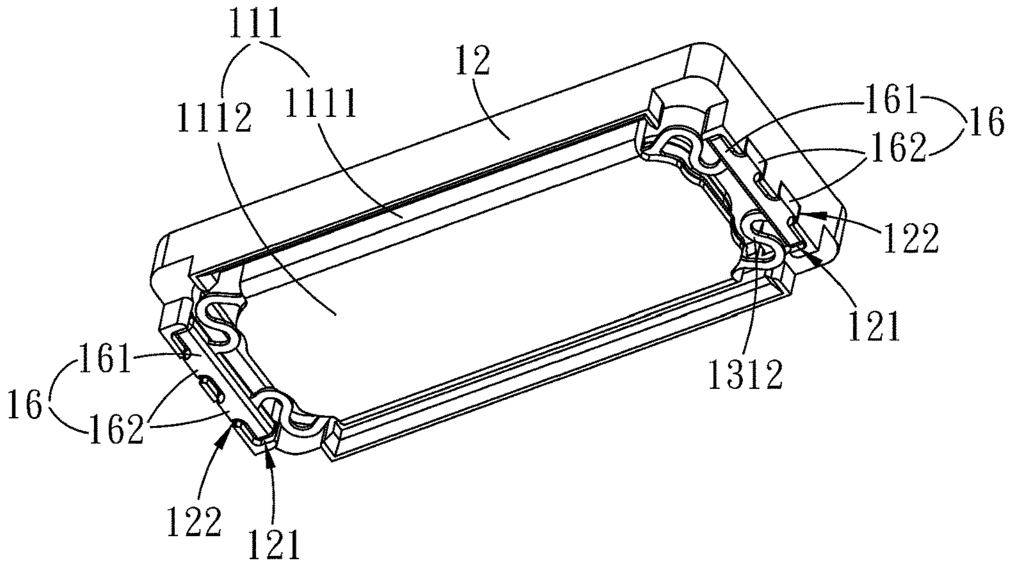
FIG. 7 illustrates a schematic partial view of the second embodiment of the speaker device of the present invention.

With reference to FIG. 6 and FIG. 7, which illustrate a schematic partial exploded view of a second embodiment of the speaker device of the present invention and a schematic partial view of the second embodiment of the speaker device of the present invention. As shown in figure, the difference between the first embodiment and the second embodiment is a damper 16. The damper 16 is disposed at the fixing bracket 1311 of the first flexible member 131, thus the fixing bracket 1311 is fixed and connected with the outer frame 12 via the damper 16. The damper 16 further has a body portion 161 and a fixing convex portion 162. The fixing convex portion 162 is disposed at one side of the body portion 161. The fixing bracket 1311 is wrapped around by the body portion 161. The outer frame 12 has a fixing groove 121 and a fixing notch 122. The fixing groove 121 is communicated with the fixing notch 122. The body portion 161 of the damper 16 is embedded into the fixing groove 121, and the fixing convex portion 162 is embedded into the fixing notch 122. The damper 16 is capable of absorbing the vibration from the flexible member 131, in order to lower down the vibration of the first flexible member 131 to the outer frame 12. Additionally, the damper 16 is made of silicon, but not limited thereto.

Figure 8:
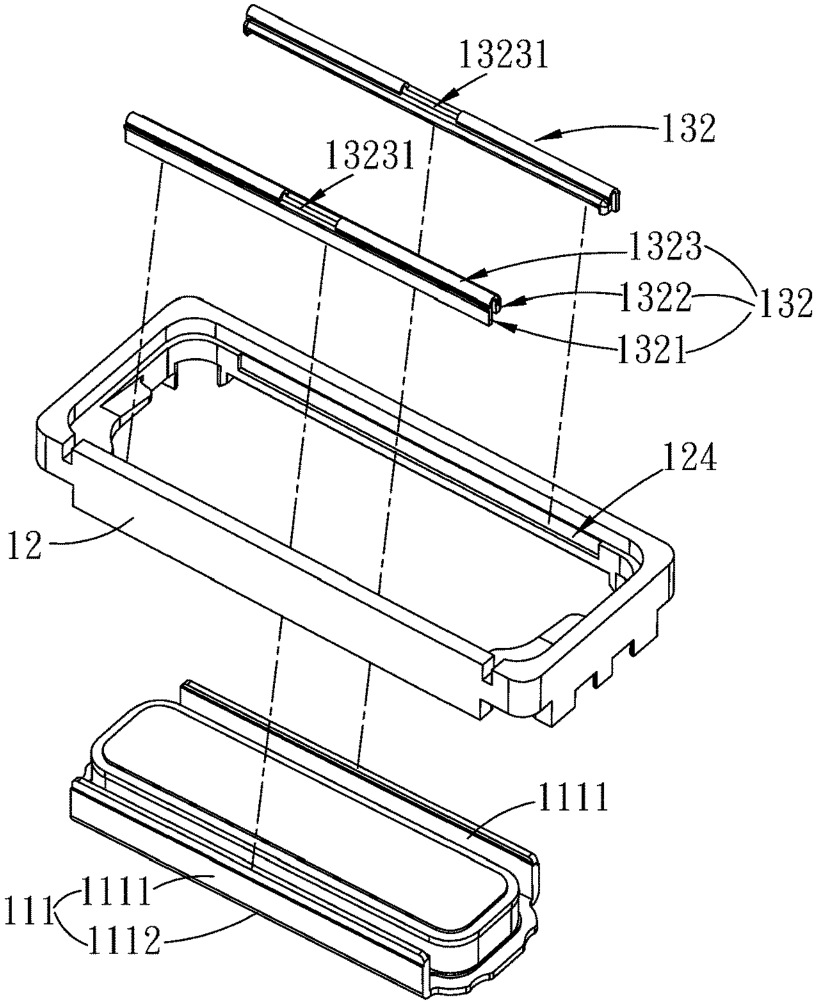
FIG. 8 illustrates a schematic partial exploded view of a third embodiment of the speaker device of the present invention.
Figure 9:
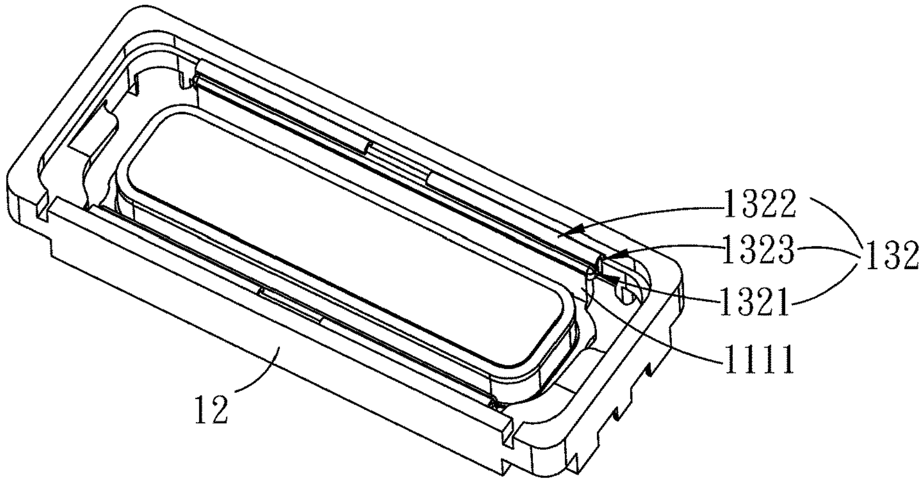
FIG. 9 illustrates a schematic partial view of the third embodiment of the speaker device of the present invention.

In regard to FIG. 8 and FIG. 9, which illustrate a schematic partial exploded view of a third embodiment of the speaker device of the present invention and a schematic partial view of the third embodiment of the speaker device of the present invention. As shown in figure, the difference between the third embodiment and the first embodiment is that the elastic member 13 has two second flexible members 132. As to the embodiment, the two second flexible members 132 are connected with the two lateral walls 1111 of the magnetic carrier 111 and the outer frame 12. The internal sides of the outer frame 12 have two connection notches 124, and the second flexible member 132 is a wave connection structure. Each of the two second flexible members 132 has a first connecting side 1321, a second connecting side 1322 and a bending portion 1323, the bending portion 1323 is bent and connected with the first connecting side 1321 and the second connecting side 1322. As to further descriptions, since the two second flexible members 132 are connected with the two lateral walls 1111 of the magnetic carrier 111 and the outer frame 12, the whole length of the second flexible member 132 is greater than a half of the length of the internal peripheral of the outer frame 12 and/or a half of the length of the lateral wall 1111, in order to stable the connection between the magnetic carrier 111 and the outer frame 12. In addition, the connections between the magnetic carrier 111 and the outer frame 12 are through the plural second flexible members 132, and the second flexible members 132 are arranged at intervals. Hence, such embodiment is able to stable the connection between the magnetic carrier 111 and the outer frame 12 as well.

Figure 12:
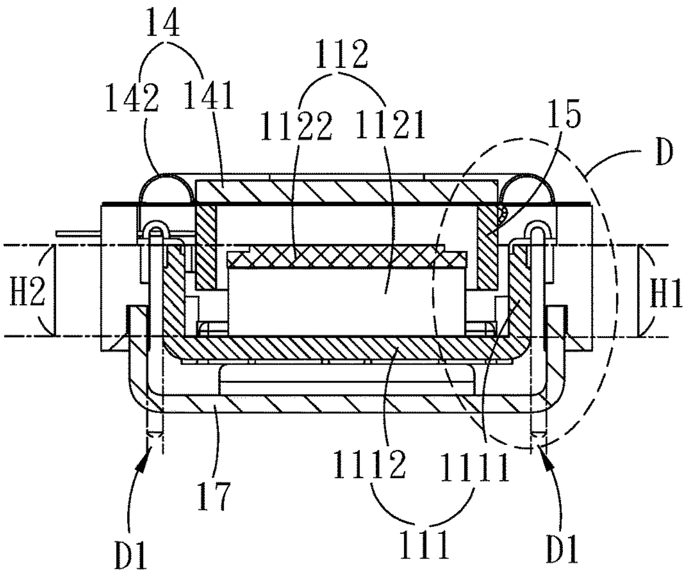
FIG. 12 illustrates a sectional view of a cross section taken along line B-B' of FIG. 1.
Figure 13:
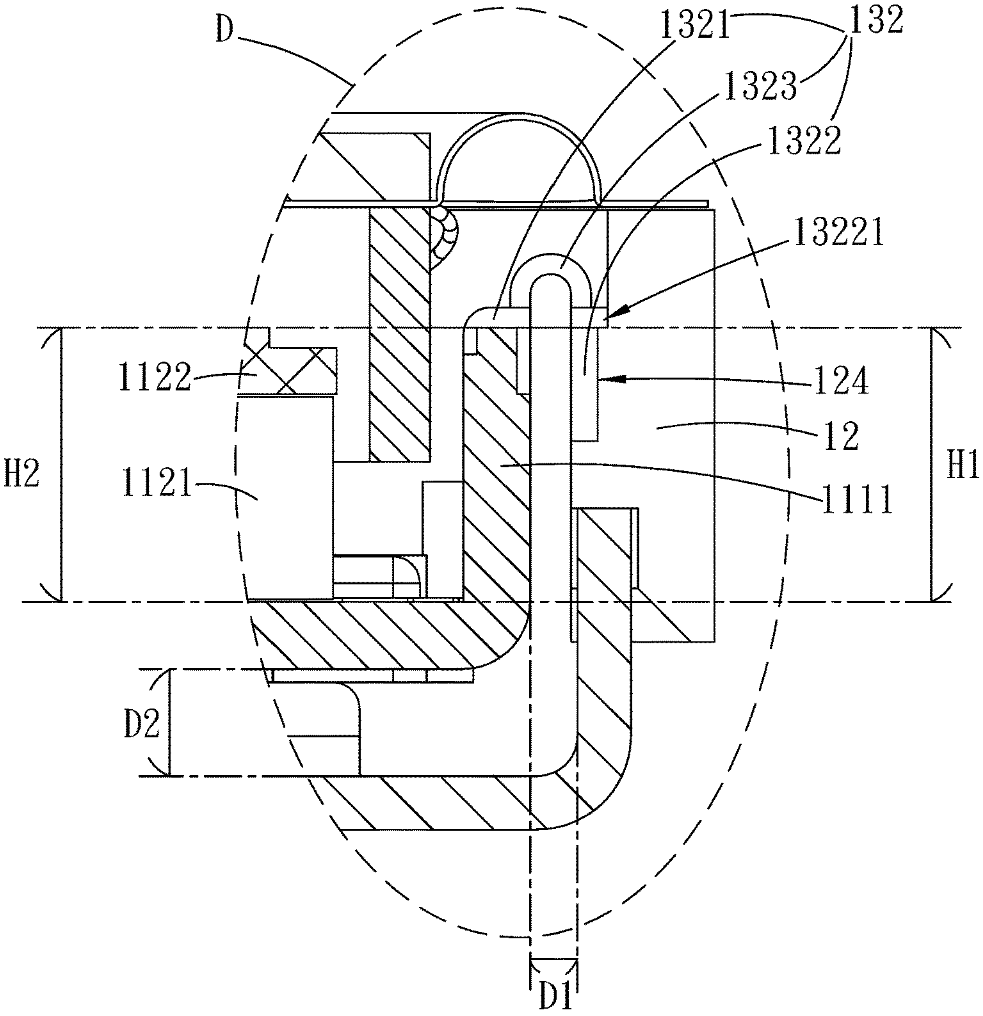
FIG. 13 illustrates a schematic partial zoom-in view of a D-section of FIG. 12.

Regarding FIG. 12 and FIG. 13, the first connecting side 1321 of the second flexible member is connected with and fixed at the top edge of the lateral wall 1111 of the magnetic carrier 111, wherein the first connecting side 1321 wraps around the top edge of the lateral wall 1111 of the magnetic carrier 111. The second connecting side 1322 of the second flexible member 132 is connected with and firmly fixed in the in the connecting groove 124, wherein one side, corresponding to the connecting groove 124, of the second connecting side 1322 has a protrusion 13221, and the second connecting side 1322 being embedded in the connecting groove 124, the protrusion 13221 is fastened above a side wall of the connecting groove 124, such that the strength to connect the second connecting side 1322 and the connecting groove 124 is increased. As a matter of fact, the second flexible member 132 is elongated along the lateral wall 1111 of the magnetic carrier 111 and absorbs the vibration from the lateral wall 1111 of the magnetic carrier 111, so as to reduce the vibration affection of the lateral wall 1111 of the magnetic carrier 111 to the outer frame 12. The second flexible member 132 is made of silicon.

More, the bending portion 1323 of the second flexible member 132 is plural, so that the plurality of bending portions 1323 are connected with the first connecting side 1321 and the second connecting side 1322. In this way, the connecting strength of the lateral wall 1111 of the magnetic carrier 111 and the outer frame 12 is reduced. That is, the degree of freedom between the magnetic element 11 and the outer frame 12 is increased, which helps to improve the second flexible member 132 to absorb the vibration transmitted by the magnetic element 11 to the outer frame 12. At the same time, there is a spacing hole 13231 between every two bending portions 1323, and the spacing holes 13231 can balance the pressure of the magnetic element 11 inside the outer frame 12 and the circulation of the air flow, which can be used as a heat dissipation effect. The quantity of the above-mentioned bending portions 1323 and the spacing holes 13231 can be adjusted correspondingly according to the requirement of the user.

The differences among the present embodiment, the first embodiment and the second embodiment are the lengths of the elastic members 13 connecting with the magnetic element 11 and the outer frame 12. The connecting length of the second flexible member 132 in this embodiment is relatively long, which increases the connecting strength between the magnetic element 11 and the outer frame 12, thereby reducing the vibration amplitude of the magnetic element 11, but the connecting strength of the second flexible member 132 is also high. In other words, the magnetic element 11 can be better to transmit the vibration force to the outer frame 12. Conversely, if the connecting strength of the first flexible member 131 of the first embodiment and the second embodiment is low, the connection restriction on the magnetic element 11 is small, and the vibration amplitude of the magnetic element 11 connected by the second flexible member 132 is large. The first flexible member 131 can be better to absorb the vibration of the magnetic element 11 to reduce the impact of the vibration of the magnetic element 11 on the outer frame 12.

Figure 10:
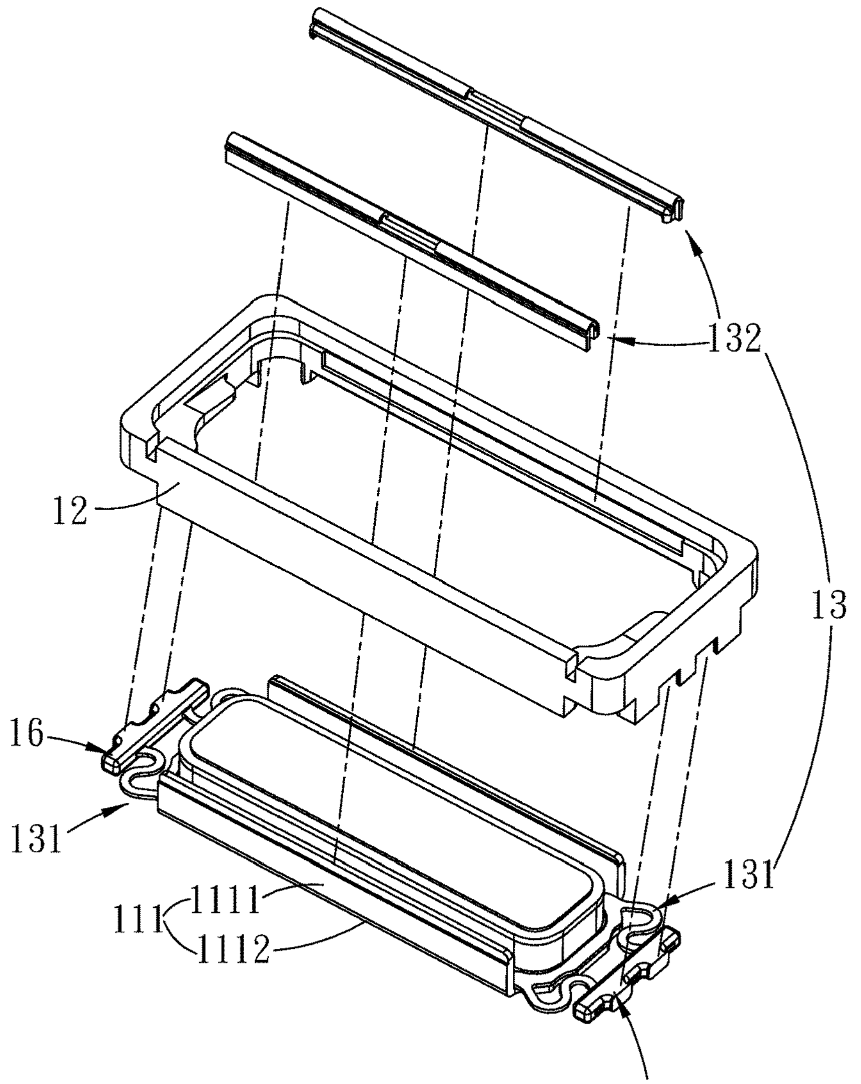
FIG. 10 illustrates a schematic partial exploded view of a fourth embodiment of the speaker device of the present invention.
Figure 11:
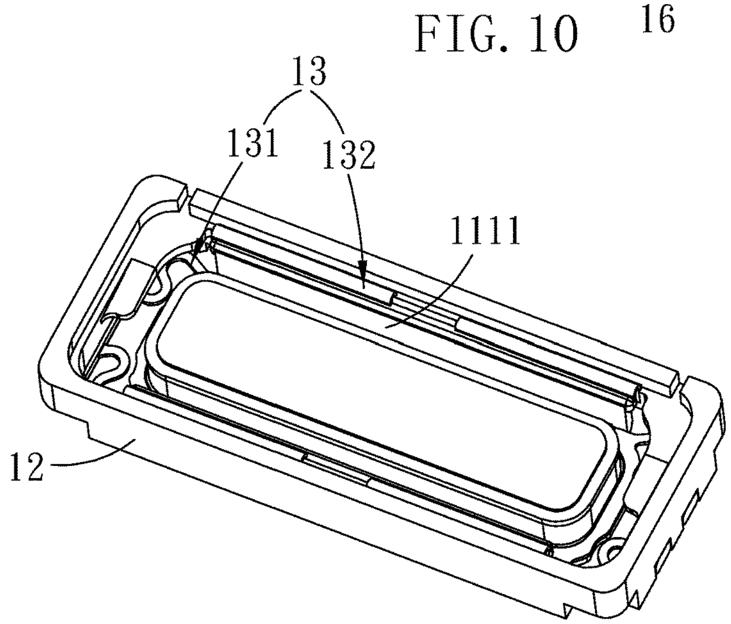
FIG. 11 illustrates a schematic partial view of the fourth embodiment of the speaker device of the present invention.

Please refer to FIG. 10 and FIG. 11, which illustrate which illustrate a schematic partial exploded view of a fourth embodiment of the speaker device of the present invention and a schematic partial view of the fourth embodiment of the speaker device of the present invention. As shown in figure, the present embodiment is a combined application of the first embodiment to the third embodiment. The elastic member 13 for the present embodiment has the first flexible member 131 and the second flexible member 132, which are connected with the peripheral of the magnetic element 11 respectively, in order to maintain that the magnetic element 11 is disposed in the outer frame 12 in a suspended connection. The structures and functions of the present embodiment is the same as the structures and functions of the first embodiment to the third embodiment, and they are not described any further hereinafter.

According to FIG. 12 and FIG. 13, which illustrate a schematic view of a cross section taken along line B-B' of FIG. 1 and a schematic partial zoom-in view of a D-section of FIG. 12. As shown in figure, the magnetic element 11 is assembled by disposing the magnetic circuit module 112 on the bottom plate 1112 of the magnetic carrier 111. The magnetic circuit module 112 is located between the two lateral walls 1111 of the magnetic carrier 111. The magnetic circuit module 112 further has a magnetic body 1121 and a magnetic plate 1122, and the magnetic body 1121 is disposed on the bottom plate 1112, and the magnetic plate 1122 is disposed on the magnetic body 1121. A height H1 of the lateral wall 1111 is equal to a height H2 of the magnetic circuit module 112.

Figure 14:
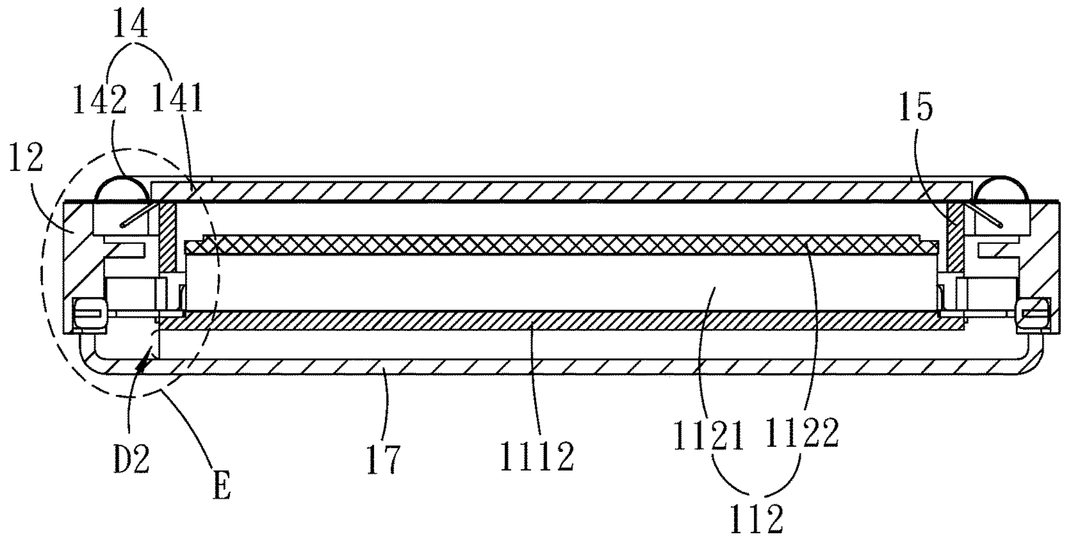
FIG. 14 illustrates a schematic view of a cross section taken along line C-C' of FIG. 1.
Figure 15:
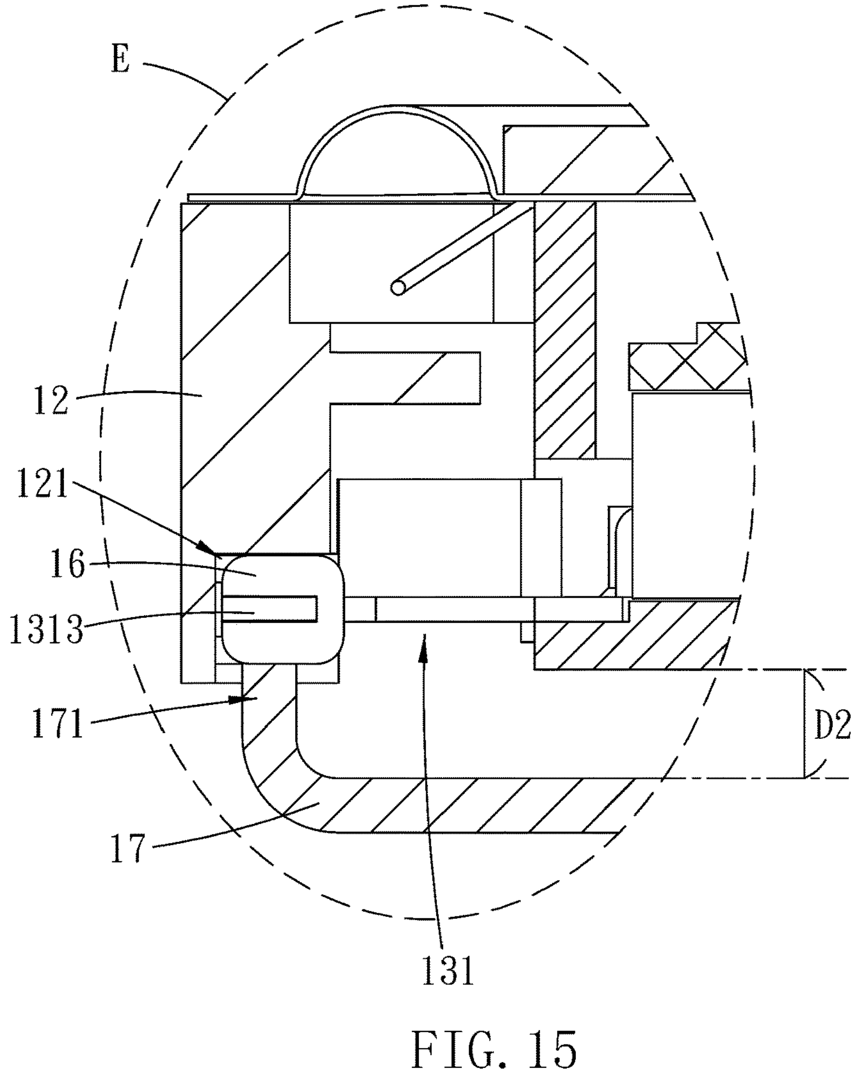
FIG. 15 illustrates a schematic partial zoom-in of an E-section of FIG. 14.

In relation to FIG. 14 and FIG. 15, which illustrate a schematic view of a cross section taken along line C-C' of FIG. 1 and a schematic partial zoom-in of an E-section of FIG. 14. As shown in figure, the speaker device 1 further has a bottom case 17, which is beneath the outer frame 12, a second interval D2 is defined as a distance between the bottom plate 1112 of the magnetic carrier 111 of the magnetic element 11 and the bottom case 17. The gap between the bottom case 17 and the magnetic element 11 can provide air circulation, such enhanced heat convection, so that the heat dissipation effect of the speaker device 1 will be better. The bottom case 17 is beneath the outer frame 12, and a position, corresponding to the damper 16, of the bottom case 17, is an urging portion 171, in order to urge the damper 16. Such that, the structural strength of the damper 16 being fixed in the fixing groove 121 of the outer frame 12 is enhanced.

Figure 16:
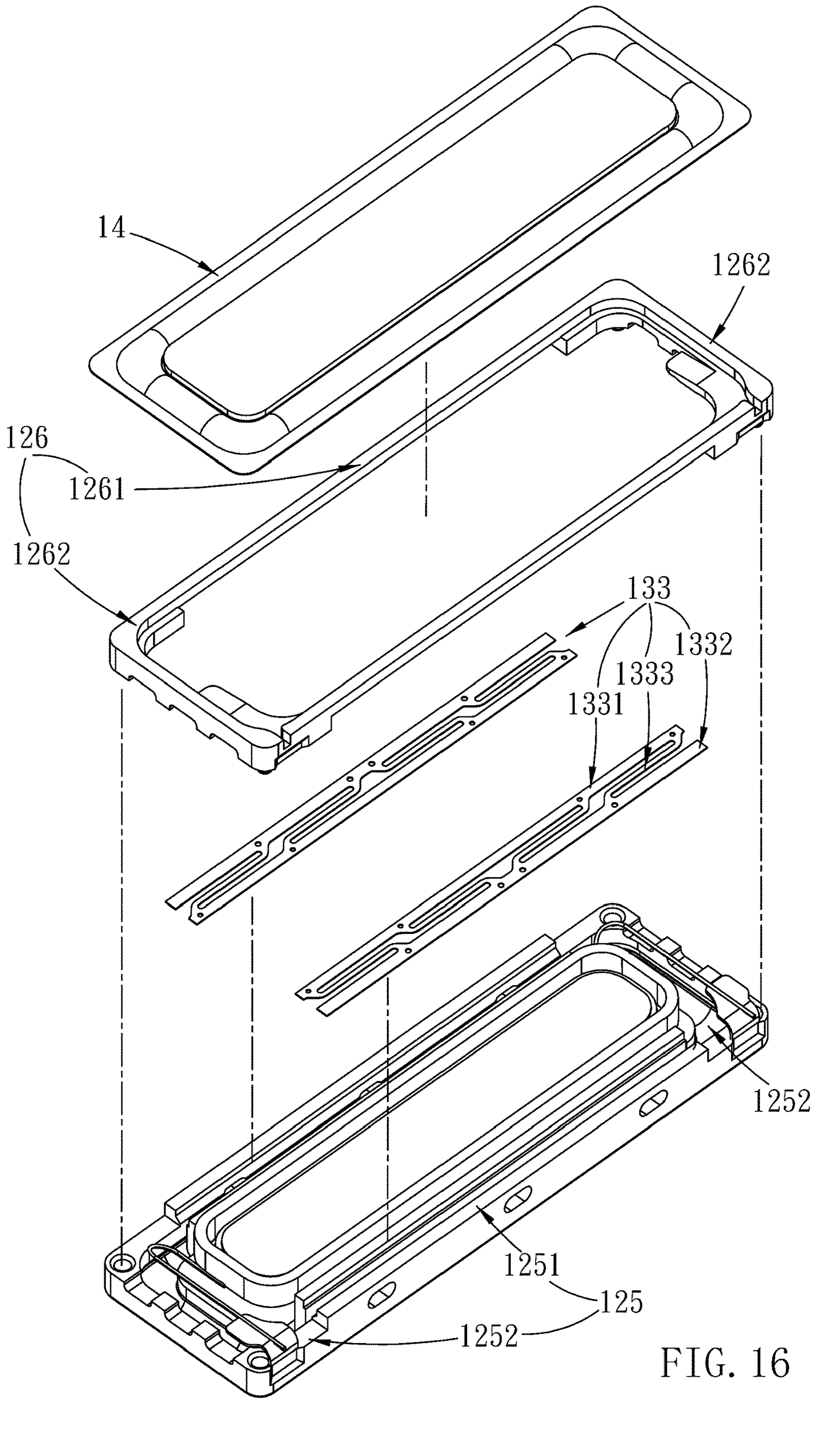
FIG. 16 illustrates a schematic partial exploded view of a fourth embodiment of the speaker device of the present invention.
Figure 17:
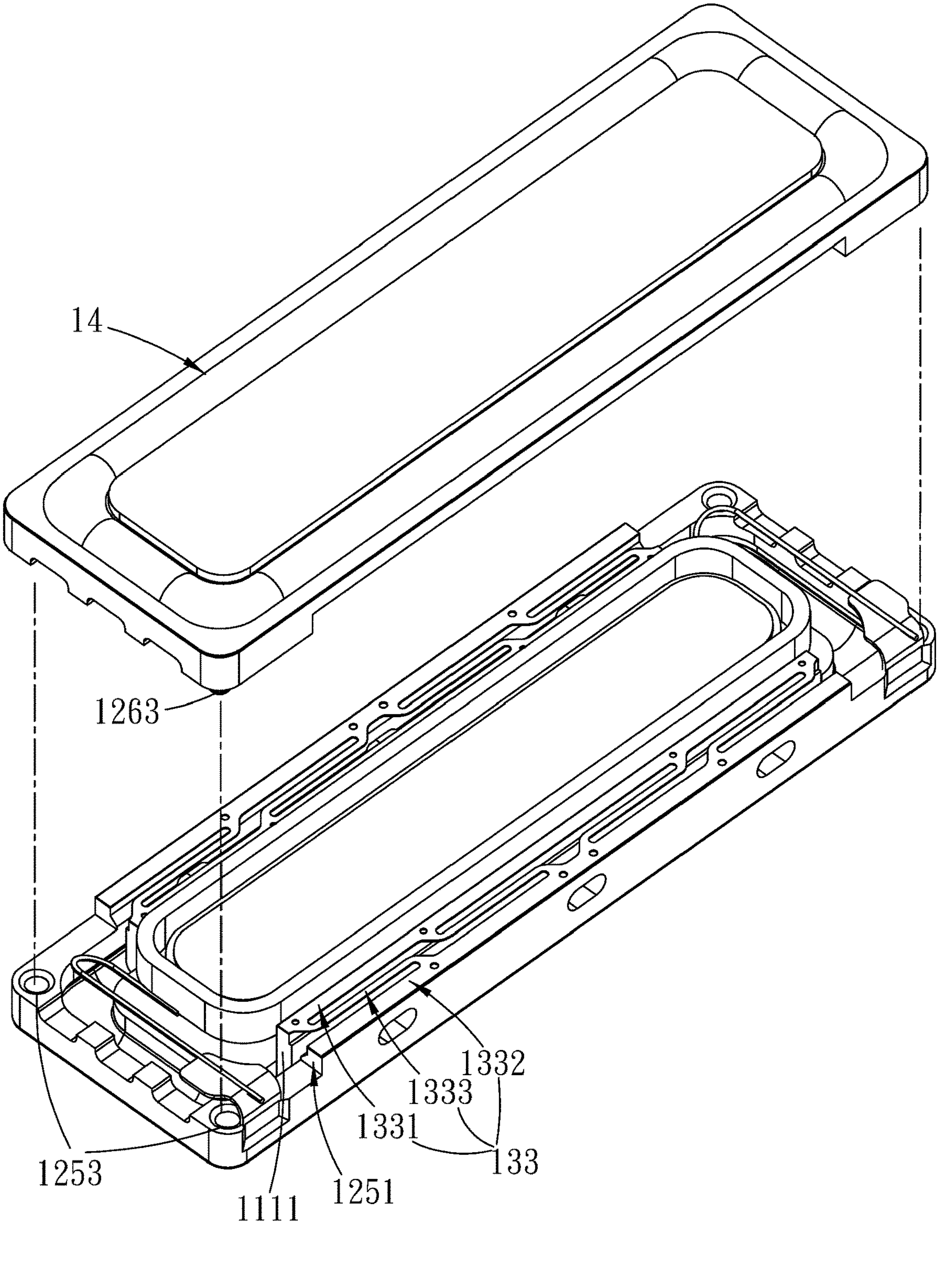
FIG. 17 illustrates another schematic partial exploded view of the fourth embodiment of the speaker device of the present invention.

As to FIG. 16 and FIG. 17, which illustrate a schematic partial exploded view of a fourth embodiment of the speaker device of the present invention and another schematic partial view. As shown in figure, the difference between the fourth embodiment and the third embodiment is the structure of the elastic member 13. For the present embodiment, the elastic member 13 further has two third flexible members 133, which are connected with the two lateral walls 1111 of the magnetic carrier 111 and the outer frame 12. The third flexible member 133 has a first metal side 1331, a second metal side 1332 and a metal bracket 1333, wherein two ends of the metal bracket 1333 are connected with the first metal side 1331 and the second metal side 1332. The first metal side 1331 is fixed at a top edge of the lateral wall 1111 of the magnetic carrier 111, and the second metal side 1332 is fixed at the outer frame 12. More, the metal bracket 1333 is parallel to the first metal side 1331 and the second metal side 1332. One end of the metal bracket 1333 is laterally elongated to connected with the first metal side 1331, and another end of the metal bracket 1333 is laterally elongated to connected with the second metal side 1332. In this embodiment, the third flexible member 133 made of metal is beneficial to suppress vibration of the magnetic element 11 in a non-up-and-down direction.

Figure 18:
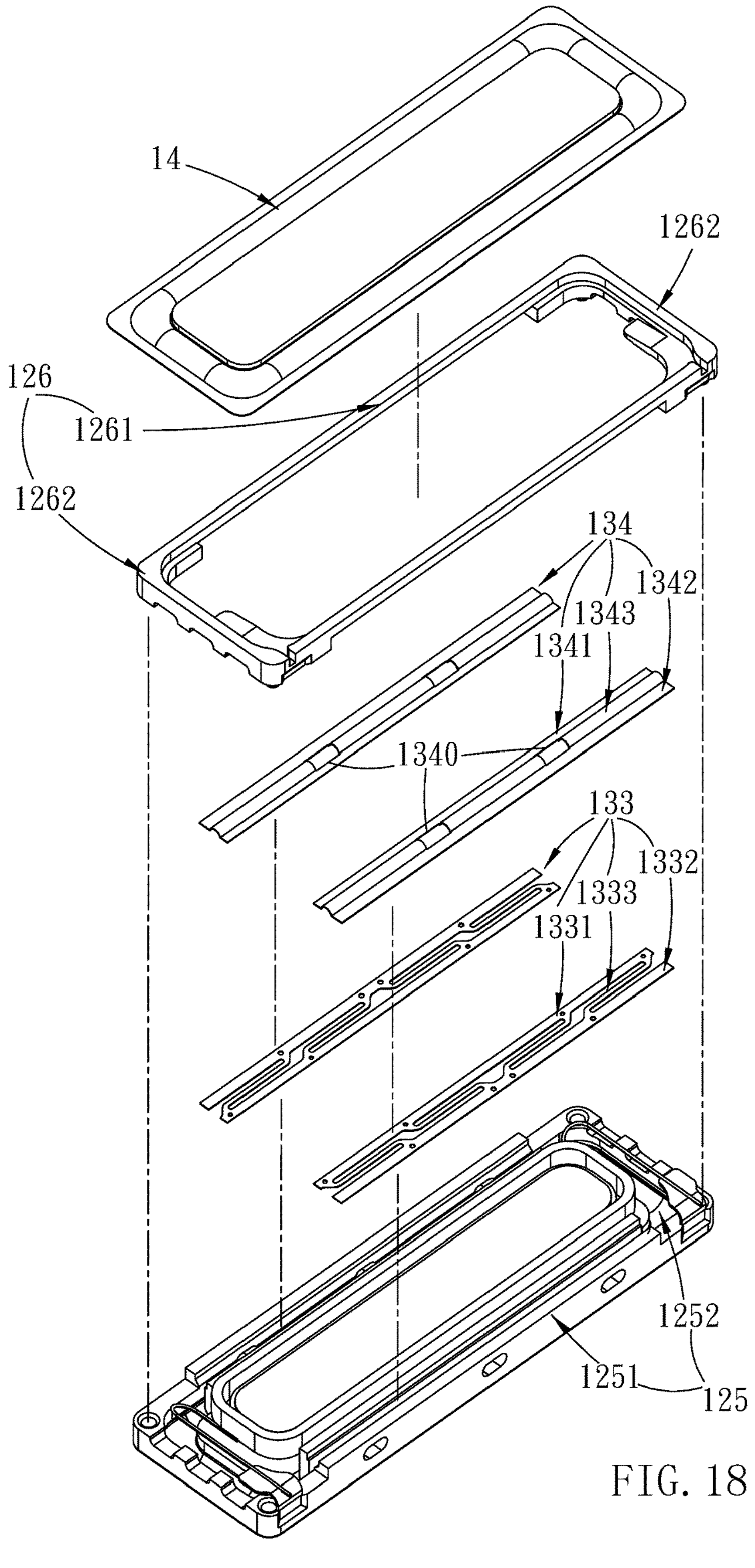
FIG. 18 illustrates a schematic partial exploded view of a fifth embodiment of the speaker device of the present invention.
Figure 19:
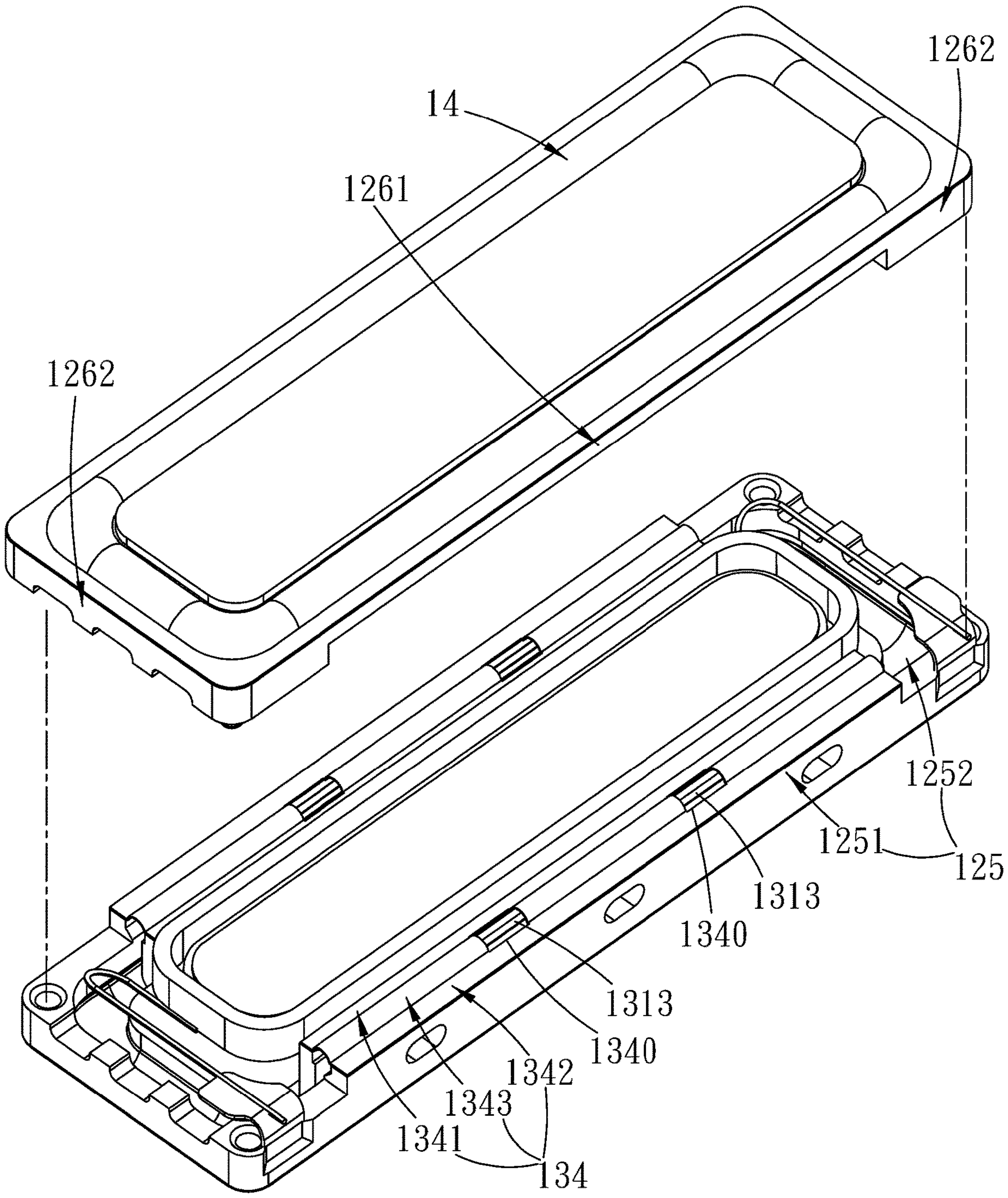
FIG. 19 illustrates another schematic partial exploded view of the fifth embodiment of the speaker device of the present invention.

Please refer to FIG. 18 and FIG. 19, which illustrate a schematic partial exploded view of a fifth embodiment of the speaker device of the present invention and another schematic view. As shown in figure, the difference between the present embodiment and the fourth embodiment is the structure of the elastic member 13. For the present embodiment, the elastic member 13 further has two fourth flexible members 134, which are disposed at the third flexible members 133, each of the two fourth flexible members (134) being disposed between the lateral wall 1111 of the magnetic carrier 111 and the outer frame 12. The fourth flexible member 134 has a first connecting side 1341, a second connecting side 1342 and a bending portion 1343. The bending portion 1343 is bent and connected with the first connecting side 1341 and the second connecting side 1342. The first connecting side 1341 is fixed at the first metal side 1331 of the metal bracket 1333, and the second connecting side 1342 is fixed at the second metal side 1332 of the metal bracket 1333. In this way, the soft plastic material of the fourth flexible member 134 can assist the third flexible member 133 in suppressing the non-up-down direction vibration of the magnetic element 11.

Accordingly, the bending portion 1343 of the fourth flexible member 134 is plural, an air hole 1340 between the pair of two adjacent bending portions 1343. The upper and lower positions of the bending portion 1343 and the metal bracket 1333 correspond to each other, and the air hole 1340 of the bent portion 1343 corresponds to the metal bracket 1333, wherein the metal bracket 1333 corresponds to the center of the air hole 1340, and the air hole 1340 is divided into left and right holes. In this way, a more even airflow distribution can be generated for the air inside the speaker device 1, so as to improve the average sound generation effect of the vibrating air inside the speaker device 1.

The elastic member 13 of the aforesaid embodiment further has the third flexible member 133 and/or the fourth flexible member 134, but there is no limitation. In another way, the third flexible member 133 and/or the fourth flexible member 134 are able to assemble with the first flexible member 131 for more applications. Therefore, the applications for the elastic member 13 of the embodiment are adjustable on demands.

Figure 20:
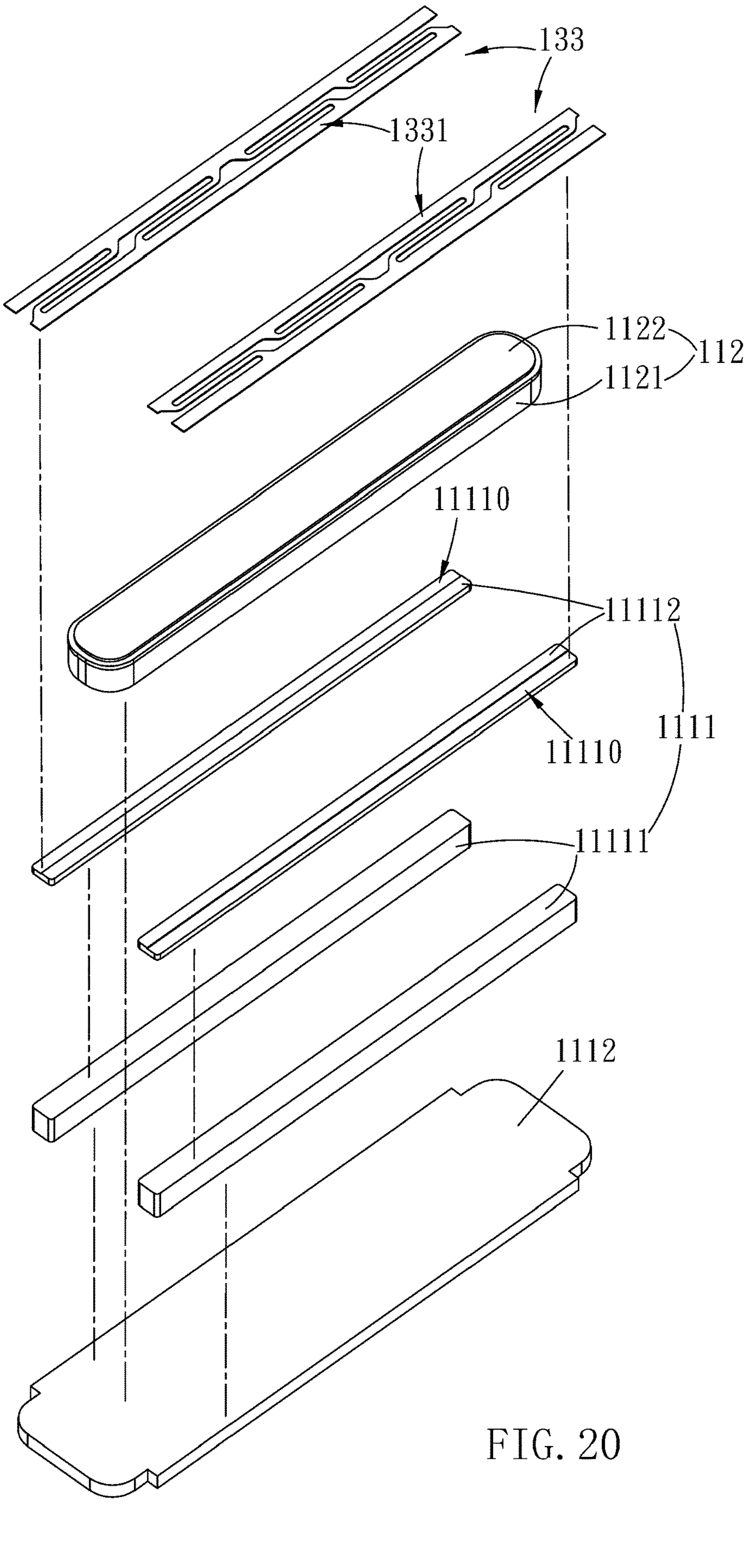
FIG. 20 illustrates a schematic partial exploded view of a sixth embodiment of the speaker device of the present invention.
Figure 21:
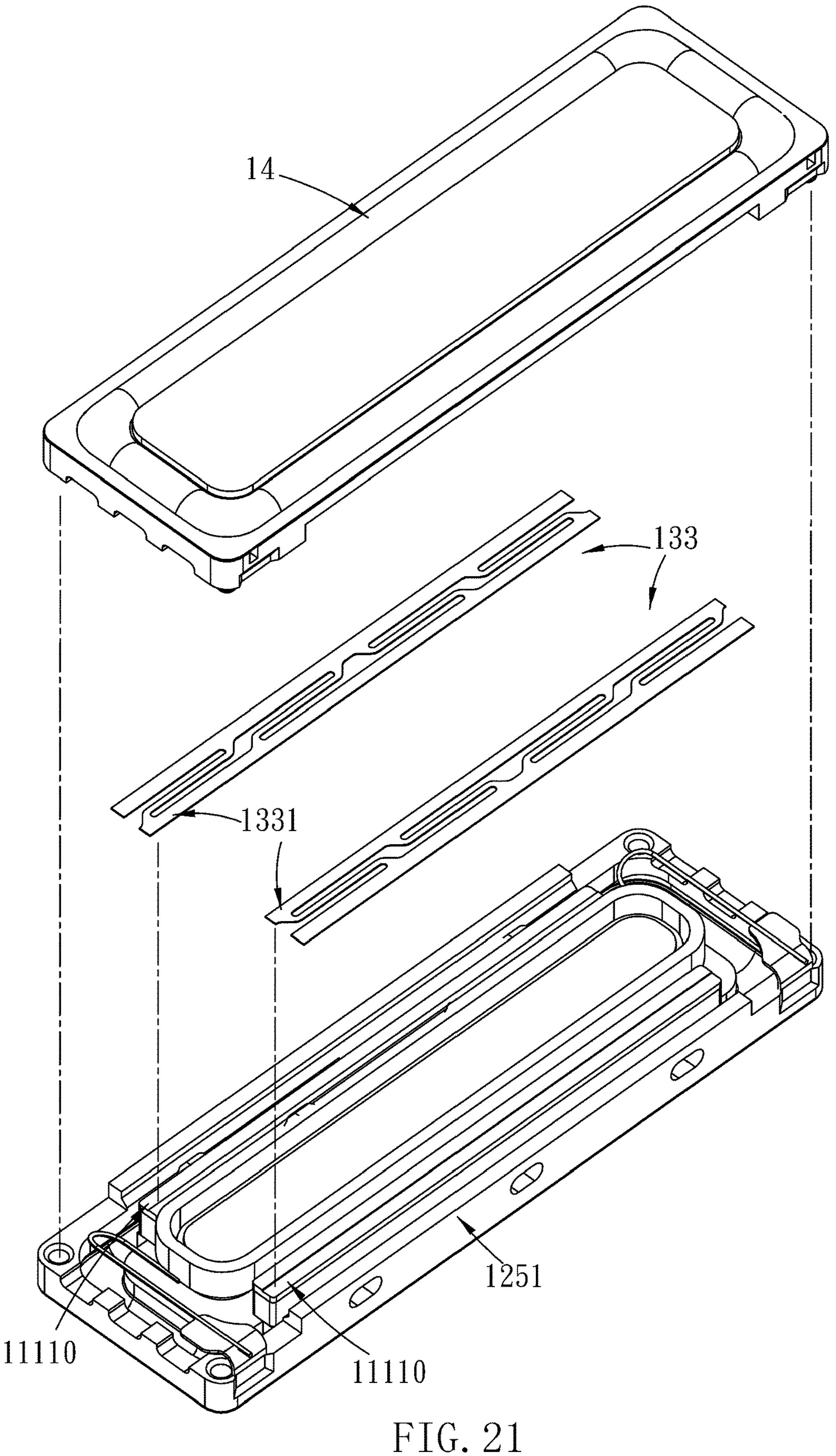
FIG. 21 illustrates a schematic partial exploded view of the sixth embodiment of the speaker device of the present invention.

Please refer to FIG. 20 and FIG. 21, which illustrate a schematic partial exploded view of a sixth embodiment of the speaker device of the present invention and another schematic view. As shown in figure, the difference between the present embodiment and the first embodiment is the structure of the magnetic carrier 111. Please again refer to FIG. 3, the magnetic element 11 has a magnetic carrier 111 and a magnetic circuit module 112. The magnetic circuit module 112 is disposed on the magnetic carrier 111, wherein the bottom plate 1112 and the two lateral walls 1111 are integrally formed as one member of a U-type structure. About the present embodiment, each of the two lateral walls 1111 of the magnetic carrier 111 has a lateral magnetic member 11111 and a lateral magnetic plate 11112. The two lateral magnetic members 11111 are disposed on two sides of the bottom plate 1112, and the two lateral magnetic plates 11112 are located on the two lateral magnetic members 11111. Additionally, an external side of each of the lateral magnetic plates 11112 has a magnetic notch 11110, and one side of the elastic member 13 is fixed in the magnetic notch 11110.

Figure 22:
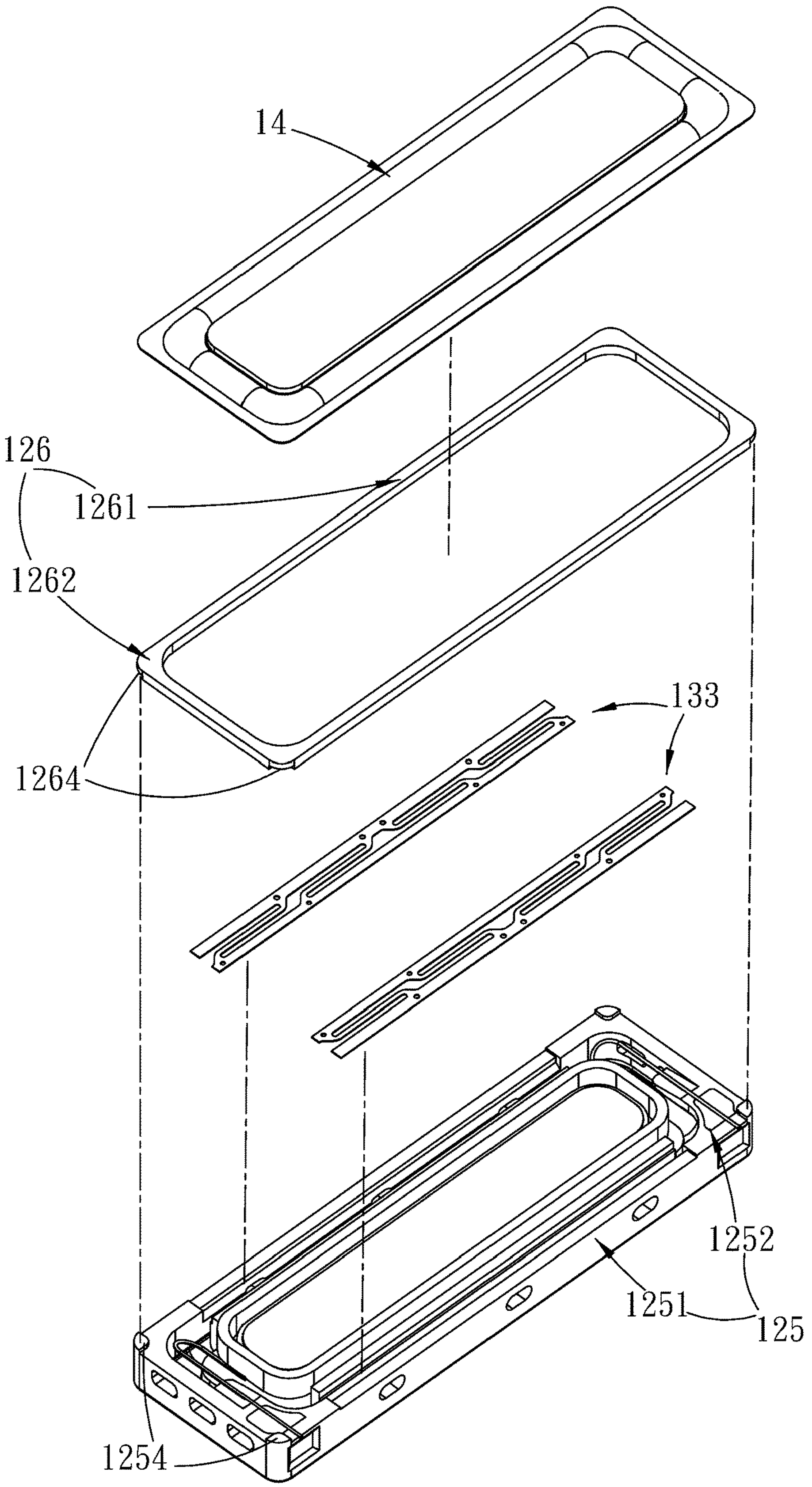
FIG. 22 illustrates a schematic partial exploded view of a seventh embodiment of the speaker device of the present invention.

With respect to FIG. 22, which illustrates a schematic partial exploded view of a seventh embodiment of the speaker device of the present invention. As shown in figure, the difference among the present embodiment, the first embodiment and the fourth embodiment is the outer frame 12. Please again refer to FIG. 3, the outer frame 12 for the first embodiment is a single outer frame, and an external side of the elastic member 13 is directly fixed on an internal lateral wall of the outer frame 12. The outer frame 12 of the present embodiment is assembled by two frames, and so does the fourth embodiment. The outer frame 12 further has a first frame 125 and a second frame 126, two external sides of the elastic member 13 are fixed at the first frame 125 and the second frame 126. The first frame 125 has a first frame portion 1251 and two first fixing portions 1252, and the two first fixing portions 1252 are at two ends of the first frame portion 1251. The second frame 126 has a second frame portion 1261 and two second fixing portions 1262. The second frame portion 1261 is combined on the first frame portion 1251. Two outer sides of the elastic member 13 are fixed at the first frame portion 1251 and the second frame portion 1261. The two second fixing portions 1262 are combined on the two first fixing portions (1252). In the embodiment, there is no limitation for that the vibration member 14 should be fixed on the first frame 125 or a second frame 126.

Figure 23:
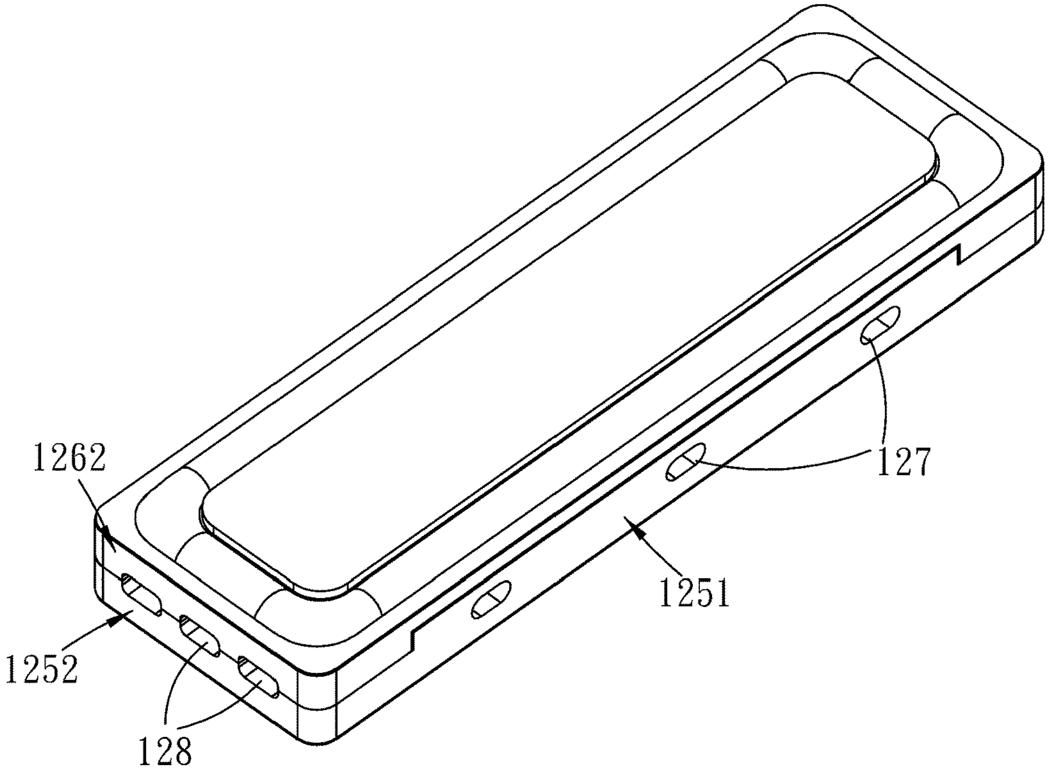
FIG. 23 illustrates a schematic assembly view of the outer frame of the fourth embodiment of the speaker device of the present invention.

Please also refer to FIG. 23, which illustrates a schematic assembly view of the outer frame of the fourth embodiment of the speaker device of the present invention. As shown in figure, further descriptions to the outer frame 12 of the fourth embodiment will be discussed as following. The first frame portion 1251 is protruded out from the two first fixing portions 1252, and the second frame portion 1261 is recessed in the two second fixing portions 1262 The first frame portion 1251 is embedded in the second frame portion 1261, and the two second fixing portions 1262 are combined on the two first fixing portions 1252. Two heights of the two first fixing portions 1252 are the same as two heights of the two second fixing portions 1262. The two first fixing portions 1252 have two fixing holes 1253, and the two second fixing portions 1262 have two columns 1263, wherein the two columns 1263 of the two second fixing portions 1262 are embedded in the two fixing holes 1253 of the two first fixing portions 1252. In this way, the outer frame 12 is assembled by the first frame 125 and the second frame 126. Additionally, in the embodiment, the outer frame 12 further has a plurality of first air holes 127 and second air holes 128. The first air holes 127 are disposed on a side surface of the first frame portion 1251 of the first frame 125. The second air holes 128 are disposed between the two first fixing portions 1252 of the first frame 125 and the two second fixing portions 1262 of the second frame 126. In other words, the plurality of the second air holes 128 are assembled by the two first fixing portions 1252 and the two second fixing portions 1262.

Further descriptions need to be mentioned, the plurality of first air holes 127 and the plurality of second air holes 128 can provide enhanced heat conduction and convection during the operation of the speaker, so that the heat dissipation effect is better, and the sound distortion caused by overheating of the speaker can be prevented.

Figure 24:
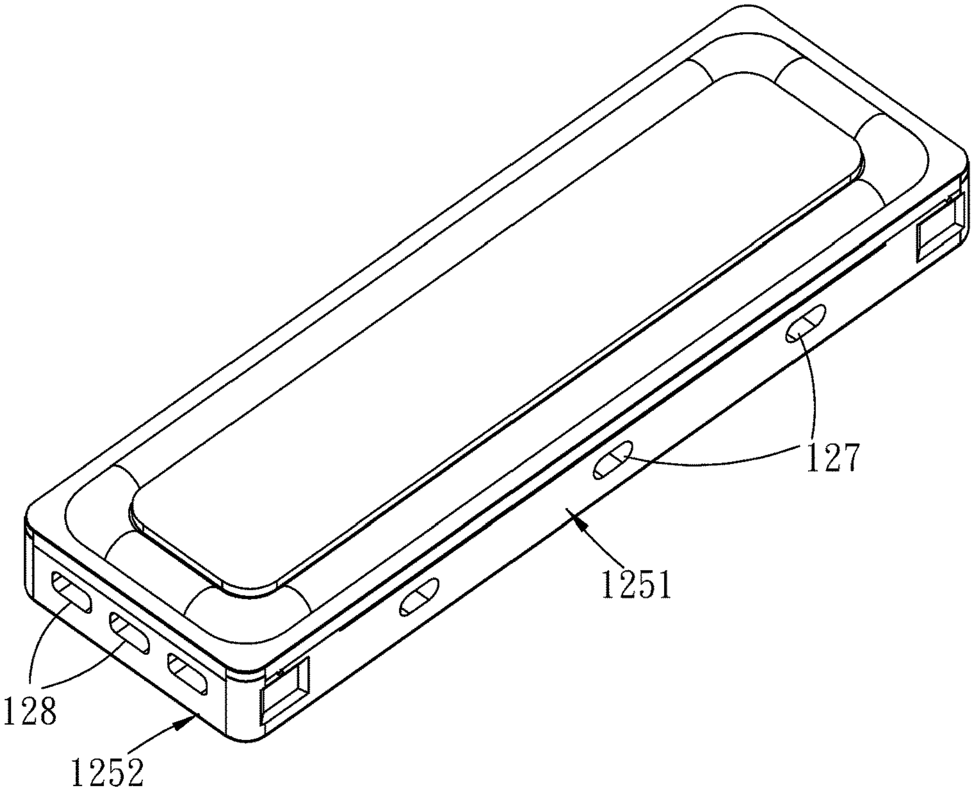
FIG. 24 illustrates a schematic assembly view of the outer frame of the seventh embodiment of the speaker device of the present invention.

Please also refer to FIG. 24, which illustrates a schematic assembly view of the outer frame of the seventh embodiment of the speaker device of the present invention. As shown in figure, further descriptions to the outer frame 12 of the seventh embodiment will be discussed as following. The first frame portion 125 is recessed in the two second fixing portions 1252, and a height of the second frame 126 is the same as two heights of the two second fixing portions (1262). The second frame portion 1261 is disposed on the first frame portion 1251, and the second frame portion 1261 covers a recess structure of the first frame portion 1251. An external side of the elastic member 13 can be just accommodated by the recess structure. In such way, via the second frame portion 1261, the external side of the elastic member 13 is able to be fixed on the first frame portion 1251. The two first fixing portions 1252 have four side columns 1254 at corners thereof, and the two second fixing portions 1262 have four side grooves 1264. Thus, the four side columns 1254 of the two first fixing portions 1252 are embedded in the four side grooves 1264 of the two second fixing portions 1262. As it can be seen, the side columns 1254 of the first frame 125 can firmly and effectively hold the second frame 126. The height of the second frame 126 is less than the height of the first frame 125, and the second frame 126 is a stainless steel structure. When the vibrating member 14 is fixed on the second frame 126, and the second frame 126 is with a strong structural rigidity, which is helpful for vibration conduction and sound conduction. More, about the embodiment, the outer frame 12 further has a plurality of first air holes 127 and second air holes 128, wherein the first air holes 127 are disposed on a side surface of the first frame portion 1251 of the first frame 125, and the second air holes 128 are disposed on an end surface of the first fixing portion 1252 of the first frame 125.

As a conclusion, the present invention provides a speaker device, the elastic members of which are connected with the magnetic element and the outer frame. When the magnetic element performs electromagnetic induction to make the voice coil and the vibration member vibrate and produce sound, the magnetic element will vibrate under the same reaction force. At this time, the vibration force of the magnetic element is transmitted to the outer frame through the elastic members, and the vibration force has been absorbed by the elastic members to greatly reduce the impact on the outer frame, thereby reducing the impact of the vibration of the outer frame on the vibration member.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A speaker device, comprising:

a magnetic element, having a magnetic carrier and a magnetic circuit module, the magnetic carrier having two lateral walls and one bottom plate, the two lateral walls being disposed at two sides of the bottom plate, the magnetic circuit module being disposed on the bottom plate;

an outer frame, disposed at a peripheral side of the magnetic element;

two elastic members, each connected with the magnetic carrier and the outer frame, the elastic member being respectively disposed at two sides of the magnetic carrier, wherein one of the two elastic members has two first flexible members, each of the two first flexible members has a fixing bracket, a connecting arm and a connecting bracket, the fixing bracket being connected with the outer frame, one end of the connecting arm being connected with the fixing bracket, another end of the connecting arm being connected with the connecting bracket, the connecting bracket being connected with the magnetic carrier;

a damper, disposed at the fixing bracket of the first flexible member, the fixing bracket being fixed and connected with the outer frame via the damper;

a vibration member, disposed on the outer frame and located at the magnetic element and the two elastic members; and a voice coil, disposed underneath the vibration member and located among the magnetic circuit module and the two lateral walls of the magnetic carrier;

wherein a first interval is defined as a distance between the outer frame and each of the two lateral walls, the magnetic element being disposed in the outer frame in a suspended connection through the two elastic members.

2. The speaker device according to claim 1, wherein the two first flexible members being connected with two ends of the magnetic carrier without the two lateral walls and the outer frame.

3. The speaker device according to claim 1, wherein the connecting arm is a curved structure, and a side, adjacent to the connecting arm, of the connecting bracket has an avoidance gap.

4. The speaker device according to claim 3, wherein the bottom plate of the magnetic carrier has an avoidance portion, which corresponds to the avoidance gap of the connecting bracket, the avoidance gap being connected with the avoidance portion.

5. The speaker device according to claim 1, wherein the connecting bracket is bent toward the fixing bracket, two ends of the connecting bracket being connected with and fixed to the bottom plate.

6. The speaker device according to claim 5, wherein an edge, corresponding to the connecting bracket, of the bottom plate is elongated and protruded, and the edge of the bottom plate is mated and connected with the connecting bracket.

7. The speaker device according to claim 5, wherein one end of the bottom plate corresponding to the connection bracket has a notch, and the connection bracket is correspondingly assembled in the notch.

8. The speaker device according to claim 7, wherein one side of the connecting bracket corresponding to the notch is elongated and protruded at least one supporting convex portion, the notch corresponding to the support convex portion being a connecting concave portion, which is engaged with the support convex portion.

9. The speaker device according to claim 1, wherein the damper further comprises a body portion and a fixing convex portion, the fixing convex portion being disposed at one side of the body portion, the fixing bracket being wrapped around by the body portion, the outer frame having a fixing groove and a fixing notch, the fixing groove being communicated with the fixing notch, the body portion being embedded into the fixing groove, and the fixing convex portion being embedded into the fixing notch.

10. The speaker device according to any of claim 1, wherein each of the two elastic member has two second flexible members, the two second flexible members being connected with the two lateral walls of the magnetic carrier and the outer frame.

11. The speaker device according to claim 10, wherein each of the two second flexible members has a first connecting side, a second connecting side and a bending portion, the bending portion being bent and connected with the first connecting side and the second connecting side, one of two internal sides of the outer frame having one connecting groove respectively, the first connecting side being fixed on a top edge of the lateral wall of the magnetic carrier, the second connecting side being fixed in the connecting groove.

12. The speaker device according to claim 11, wherein the bending portion is plural, a spacing hole being between the pair of two adjacent bending portions.

13. The speaker device according to claim 11, wherein the first connecting side wraps around the top edge of the lateral wall of the magnetic carrier.

14. The speaker device according to claim 11, wherein one side, corresponding to the connecting groove, of the second connecting side has a protrusion, the second connecting side being embedded in the connecting groove, the protrusion being fastened above a side wall of the connecting groove.

15. The speaker device according to any of claim 1, wherein the elastic member further has two third flexible members, which are connected with the two lateral walls of the magnetic carrier and the outer frame.

16. The speaker device according to claim 15, wherein the third flexible member has a first metal side, a second metal side and a metal bracket, two ends of the metal bracket being connected with the first metal side and the second metal side, the first metal side being fixed at a top edge of the lateral wall of the magnetic carrier, the second metal side being fixed at the outer frame.

17. The speaker device according to claim 16, wherein the metal bracket is parallel to the first metal side and the second metal side, one end of the metal bracket being laterally elongated to connected with the first metal side, another end of the metal bracket being laterally elongated to connected with the second metal side.

18. The speaker device according to claim 16, wherein the elastic member further has two fourth flexible members, which are disposed at the third flexible members, each of the two fourth flexible members being disposed between the lateral wall of the magnetic carrier and the outer frame.

19. The speaker device according to claim 18, wherein the fourth flexible member has a first connecting side, a second connecting side and a bending portion, the bending portion being bent and connected with the first connecting side and the second connecting side, the first connecting side being fixed at the first metal side of the metal bracket, the second connecting side being fixed at the second metal side of the metal bracket.

20. The speaker device according to claim 19, wherein the bending portion is plural, a air hole between the pair of two adjacent bending portions.

21. The speaker device according to claim 20, wherein the air hole corresponds to the metal bracket.

22. The speaker device according to claim 1, wherein a height of the lateral wall is equal to a height of the magnetic circuit module.

23. The speaker device according to claim 1 further comprising a bottom case, which is beneath the outer frame, a second interval is defined as a distance between the bottom plate of the magnetic carrier of the magnetic element and the bottom case.

24. The speaker device according to claim 1 further comprising a bottom case, which is beneath the outer frame, a position, corresponding to the damper, of the bottom case being an urging portion, in order to urge the damper.

25. The speaker device according to claim 1, wherein the magnetic circuit module further comprises a magnetic body and a magnetic plate, the magnetic body being disposed on the bottom plate, the magnetic plate being disposed on the magnetic body.

26. The speaker device according to claim 1, wherein the outer frame further comprises a first frame and a second frame, two external sides of the elastic member being fixed at the first frame and the second frame.

27. The speaker device according to claim 26, wherein the first frame has a first frame portion and two first fixing portions, the two first fixing portions being at two ends of the first frame portion, the second frame having a second frame portion and two second fixing portions, the second frame portion being combined on the first frame portion, two outer sides of the elastic member being fixed at the first frame portion and the second frame portion, the two second fixing portions being combined on the two first fixing portions.

28. The speaker device according to claim 27, wherein the first frame portion is protruded out between the two first fixing portions, the second frame portion being recessed between the two second fixing portions, the first frame portion being embedded in the second frame portion, the two second fixing portions being combined on the two first fixing portions.

29. The speaker device according to claim 28, wherein two heights of the two first fixing portions are the same as two heights of the two second fixing portions.

30. The speaker device according to claim 28, wherein the two first fixing portions have two fixing holes, the two second fixing portions having two columns, the two columns of the two second fixing portions being embedded in the two fixing holes of the two first fixing portions.

31. The speaker device according to claim 28, wherein the outer frame further has a plurality of first air holes and second air holes, the first air holes being disposed on a side surface of the first frame portion of the first frame, the second air holes being disposed between the two first fixing portions of the first frame and the two second fixing portions of the second frame.

32. The speaker device according to claim 27, wherein the first frame portion is recessed in the two second fixing portions, a height of the second frame being the same as two heights of the two second fixing portions, the second frame portion being disposed on the first frame portion, the second frame portion covering a recess structure of the first frame portion.

33. The speaker device according to claim 27, wherein the two first fixing portions have side columns at corners thereof, and the two second fixing portions having side grooves, the side columns of the two first fixing portions being embedded in the side grooves of the two second fixing portions.

34. The speaker device according to claim 27, wherein the outer frame further has a plurality of first air holes and second air holes, the first air holes being disposed on a side surface of the first frame portion of the first frame, the second air holes being disposed on an end surface of the first fixing portion of the first frame.

* * * * *